US012746520B2

(12) United States Patent
Vozyakov et al.

(10) Patent No.: US 12,746,520 B2
(45) Date of Patent: Sep. 29, 2026

(54) METHOD AND APPARATUS FOR WATER PROCESSING

(71) Applicants: Igor Vozyakov, New Providence (BS); Aleksandr Shcheblanov, New Providence (BS)

(72) Inventors: Igor Vozyakov, New Providence (BS); Aleksandr Shcheblanov, New Providence (BS)

(73) Assignee: Igor Vozyakov, New Providence (BS)

( * ) Notice: Subject to any disclaimer, the term of this patent is extended or adjusted under 35 U.S.C. 154(b) by 668 days.

(21) Appl. No.: 17/912,126

(22) PCT Filed: Mar. 16, 2021

(86) PCT No.: PCT/GB2021/050646
§ 371 (c)(1),
(2) Date: Sep. 16, 2022

(87) PCT Pub. No.: WO2021/186159
PCT Pub. Date: Sep. 23, 2021

(65) Prior Publication Data
US 2023/0159354 A1 May 25, 2023

(30) Foreign Application Priority Data
Mar. 16, 2020 (CH) .................................... 00301/20
Aug. 21, 2020 (GB) .................................... 2013075
(Continued)

(51) Int. Cl.
*B01F 27/271* (2022.01)
*B01F 25/64* (2022.01)
(Continued)

(52) U.S. Cl.
CPC ........ *B01F 27/2712* (2022.01); *B01F 25/642* (2022.01); *B01J 19/1806* (2013.01);
(Continued)

(58) Field of Classification Search
None
See application file for complete search history.

(56) References Cited

U.S. PATENT DOCUMENTS 4,940,538 A * 7/1990 Kyster .................... C02F 1/34
138/DIG. 6
5,470,539 A 11/1995 Imamura et al.
(Continued)

FOREIGN PATENT DOCUMENTS

GB 679891 A 9/1952
JP 2008161825 A 7/2008
(Continued)

OTHER PUBLICATIONS

International Search Report from corresponding international PCT application, PCT/GB2021/050646, dated Jun. 4, 2021, 19 pages.
(Continued)

*Primary Examiner* — Peter Keyworth
(74) *Attorney, Agent, or Firm* — Tucker Ellis LLP; Michael G. Craig; Bennett E. Kuhar

(57) ABSTRACT

A method of evaporating a fluid is provided. The method comprises forming a flow with toroidal vortices in the fluid, such that the fluid is exposed to alternating flow velocities and alternating pressures, thereby increasing evaporation of the fluid. A method of precipitating salt out of an aqueous solution is also provided. The method comprises forming a flow with toroidal vortices in the aqueous solution, such that the aqueous solution is exposed to alternating flow velocities and alternating pressures, thereby initiating precipitation of salts from the solution.

18 Claims, 14 Drawing Sheets

(30) Foreign Application Priority Data

| | | |
|---|---|---|
| Aug. 21, 2020 | (GB) | 2013078 |
| Aug. 21, 2020 | (GB) | 2013079 |
| Oct. 15, 2020 | (GB) | 2016345 |
| Nov. 23, 2020 | (GB) | 2018405 |
| Dec. 14, 2020 | (GB) | 2019678 |
| Mar. 15, 2021 | (WO) | PCT/GB2021/050640 |

(51) Int. Cl.

| | |
|---|---|
| ***B01J 19/18*** | (2006.01) |
| ***C02F 1/26*** | (2023.01) |
| ***C02F 1/52*** | (2023.01) |
| ***C10G 31/00*** | (2006.01) |
| ***C10L 1/04*** | (2006.01) |
| *B01F 25/00* | (2022.01) |
| *C02F 103/08* | (2006.01) |

(52) U.S. Cl.

CPC ................ *C02F 1/265* (2013.01); *C02F 1/52* (2013.01); *C10G 31/00* (2013.01); *C10L 1/04* (2013.01); *B01F 2025/9121* (2022.01); *B01F 2025/913* (2022.01); *B01F 2025/916* (2022.01); *C02F 2001/5218* (2013.01); *C02F 2103/08* (2013.01); *C02F 2301/024* (2013.01); *C02F 2301/026* (2013.01); *C10G 2300/1048* (2013.01); *C10L 2200/0438* (2013.01); *C10L 2290/24* (2013.01); *C10L 2290/56* (2013.01)

(56) References Cited

U.S. PATENT DOCUMENTS

| | | | | |
|---|---|---|---|---|
| 6,200,486 | B1 | 3/2001 | Chahine et al. | |
| 7,122,161 | B1 | 10/2006 | Moritz et al. | |
| 2009/0045150 | A1 * | 2/2009 | McCutchen | C02F 1/48<br>210/512.1 |
| 2011/0003370 | A1 | 1/2011 | Gordon et al. | |
| 2014/0234203 | A1 | 8/2014 | Park et al. | |

FOREIGN PATENT DOCUMENTS

| | | | |
|---|---|---|---|
| KR | 100992829 | B1 | 11/2010 |
| WO | 2015145204 | A1 | 10/2015 |
| WO | 2017127925 | A1 | 8/2017 |

OTHER PUBLICATIONS

Lee S., et al. “Experimental verification of a model for rotating reverse osmosis,” Desalination, Elsevier, Amsterdam, NL, vol. 146, No. 1-3, Sep. 10, 2002, pp. 353-359, XP004386379, ISSN: 0011-9164, https://doi.org/10.1016/80011-9164(02)00512-X.

Combined Search and Examination Report under Sections 17 and 18(3) from corresponding Great Britain Patent Application No. GB2018405.7, dated May 24, 2021, 9 pages.

Search Report under Sections 17(5) from corresponding Great Britain Patent Application No. GB2103649.6, dated Aug. 2, 2021, 5 pages.

Search Report under Sections 17(5) from corresponding Great Britain Patent Application No. GB2019678.8, dated Aug. 26, 2021, 5 pages.

* cited by examiner

METHOD AND APPARATUS FOR WATER PROCESSING

CROSS-REFERENCE TO RELATED APPLICATIONS

This application is a national phase application of International Application No. PCT/GB2021/050646, filed Mar. 16, 2021, which claims priority to PCT/GB2021/050640, filed Mar. 15, 2021, and claims priority to Switzerland Patent Application Serial No. CH00301/20, filed Mar. 16, 2020, and claims priority to Great Britain Patent Application Serial No. 2013079.5, filed Aug. 21, 2020, and claims priority to Great Britain Patent Application Serial No. 2013075.3, filed Aug. 21, 2020, and claims priority to Great Britain Patent Application Serial No. 2013078.7, filed Aug. 21, 2020, and claims priority to Great Britain Patent Application Serial No. 2016345.7, filed Oct. 15, 2020, and claims priority to Great Britain Patent Application Serial No. 2018405.7, filed Nov. 23, 2020, and claims priority to Great Britain Patent Application Serial No. 2019678.8, filed Dec. 14, 2020, all of which are incorporated herein by reference.

BACKGROUND

The present invention relates to the field of water processing, and in a particular embodiment to desalination of water.

SUMMARY

Aspects of the invention are set out in the independent claims and preferred features are set out in the dependent claims.

According to a first aspect there is provided a method of precipitating salt out of an aqueous solution, comprising steps of: providing an aqueous solution of one or more salts; and forming a flow with toroidal vortices in the aqueous solution, such that the aqueous solution is exposed to alternating flow velocities and alternating pressures, thereby initiating precipitation of salts from the solution.

According to another aspect there is provided a method of forming salt particles, comprising steps of: providing an aqueous solution of one or more salts; forming a flow with toroidal vortices in the aqueous solution, such that the aqueous solution is exposed to alternating flow velocities and alternating pressures, thereby initiating precipitation of salts from the solution; and separating salt particles from an aqueous suspension formed by precipitation of salts from the aqueous solution. The flow may be as aforementioned.

According to another aspect there is provided a method of dissolving a water-insoluble substance in water, comprising steps of: providing an aqueous suspension of a water-insoluble substance; forming a flow with toroidal vortices in the aqueous suspension, such that the aqueous suspension is exposed to alternating flow velocities and alternating pressures, thereby initiating dissolution of the water-insoluble substance. The flow may be as aforementioned.

According to another aspect there is provided a method of dissolving an insoluble substance in liquid, comprising steps of: providing a liquid, preferably water or an aqueous mixture, and an insoluble substance; and forming a flow with toroidal vortices in the liquid, such that insoluble substance entrained in the flow is exposed to alternating flow velocities and alternating pressures, thereby initiating dissolution of the insoluble substance. The flow may be as aforementioned.

According to another aspect there is provided a method of precipitating a solute out of a solvent, comprising steps of: providing an solution of one or more solutes in a solvent; and forming a flow with toroidal vortices in the solution, such that the solution is exposed to alternating flow velocities and alternating pressures, thereby initiating precipitation of solute from the solution. The flow may be as aforementioned.

According to another aspect there is provided a method of generating toroidal and spatial vortices in a liquid, by a generator for generating toroidal and spatial vortexes in a liquid, the generator comprising a substantially rotationally symmetrical stator housing with an axis and an axial inlet opening and an eccentric outlet opening directed in a plane that is oriented normal to the axis, and a rotor rotatably arranged around the axis in the stator housing with radially outwardly extending channels in constant fluid connection to the inlet opening, characterized by a rotor disc, which is attached to the rotor in a rotationally fixed manner radially outside the rotor, comprising a side surface of the rotor disc normal to the axis with inner notches spaced apart from one another and equidistant from the axis and in constant fluid connection to the rotor channels, for portion and temporarily blocking the liquid, as well as a stator disc attached with torque proof connection to the stator housing comprising a side surface of the stator disc facing the side surface of the rotor disc, the side surface of the stator disc comprising stator notches spaced apart from one another and equidistant from the axis, for providing passages for the liquid to form a periodical liquid flow from the inner notches to the stator notches, when these notches face each other due to rotation of the rotor disc in operation, for generating toroidal vortexes in the portioned liquid during use by shear stress as the portions of liquid pass from the inner notches to the stator notches and move back and forth, and for providing passages radially outside of the stator disc to the outlet opening, contributing between 70 and 95% of a total liquid flow through the generator, wherein the rotor disc and the stator disc are spaced apart by a gap to allow a permanent liquid flow through that gap from the inner notches to the outlet opening, for generating spatial vortexes during use in the laminar liquid flow due to the velocity difference of the side surfaces defining the gap and due to periodical disruptions by the portioned liquid passing the gap in axial direction, contributing between 5% and 30% of the total liquid flow through the generator; the method comprising operation of the generator for generating toroidal and spatial vortexes in a liquid, by the steps of a) bringing the liquid to the inlet opening; b) bringing the rotor with the rotor disc attached into rotation; c) producing a permanent liquid flow and a periodical liquid flow between the stator disc and the rotor disc; d) generating toroidal vortices in the portioned liquid of the periodical liquid flow by shear stress as the portions of liquid pass from the inner notches to the stator notches; e) generating spatial vortices in the permanent liquid flow in the gap between the side surfaces due to the velocity difference of the side surfaces and due to periodical disruptions by the portioned liquid passing the gap in axial direction; f) combining the permanent liquid flow and the periodical liquid flow to a total liquid flow; g) conducting the total liquid flow to the outlet opening of the generator to let it exit the generator; whereas the liquid brought to the inlet opening is water with dissolved inorganic salts, such as sea water, and the total liquid flow conducted away from the outlet opening is fresh water with admixed water-soluble crystallised inorganic salts; and optionally whereas the total liquid flow is filtered after conducted away from the outlet opening for obtaining fresh water separated from the water-soluble crystallised inorganic salts.

According to another aspect there is provided a method of producing fresh water with admixed water-soluble crystallised inorganic salts from water with dissolved inorganic salts, such as sea water, the method comprising exposing the water with dissolved inorganic salts, such as sea water, to toroidal and spatial vortexes in a liquid. The method may further comprise filtering to separate the fresh water from the admixed water-soluble crystallised inorganic salts.

According to another aspect there is provided a method of dissolving an insoluble substance in a solvent, comprising steps of: providing a mixture of one or more insoluble substance in a solvent; and forming a flow with toroidal vortices in the mixture, such that the solution is exposed to alternating flow velocities and alternating pressures, thereby initiating dissolution of the insoluble substance. The flow may be as aforementioned.

According to another aspect there is provided a method of reacting a substrate in water, comprising steps of: providing an aqueous suspension or solution of a substrate; forming a flow with toroidal vortices in the aqueous suspension or solution, such that the aqueous suspension or solution is exposed to alternating flow velocities and alternating pressures, thereby initiating reaction of the substrate. The flow may be as aforementioned.

According to another aspect there is provided a method of producing hydrogen from water, comprising steps of: forming a flow with toroidal vortices in water, such that the water is exposed to alternating flow velocities and alternating pressures; and exposing the water to an electrical potential below 1.23 V, thereby initiating electrolysis of the water. The flow may be as aforementioned. The electrical potential may be below 1.2 V, or below 1.1 V, or below 1 V, or below 0.75 V, or below 0.5 V.

According to another aspect there is provided a method of evaporating a fluid, comprising a step of forming a flow with toroidal vortices in the fluid, such that the fluid is exposed to alternating flow velocities and alternating pressures. This can increase an energy state of the fluid and decrease further energy required to evaporate the fluid, in particular the thermal energy required to evaporate the fluid. Exposure to alternating flow velocities and alternating pressures can decrease a boiling temperature for a given pressure or increase a pressure for boiling the fluid at a given temperature. The method may comprise exposing the fluid to a temperature below its nominal boiling temperature for a given pressure. The method may comprise exposing the fluid to a pressure above a nominal pressure for boiling the fluid at a given temperature. The flow may be as described or as claimed herein.

According to another aspect there is provided apparatus for precipitating salt out of an aqueous solution, comprising a flow generator adapted to form a flow with toroidal vortices in an aqueous solution such that the aqueous solution is exposed to alternating flow velocities and alternating pressures for initiating salt precipitation.

According to another aspect there is provided apparatus for dissolving a water-insoluble substance in water, comprising a flow generator adapted to form a flow with toroidal vortices in an aqueous suspension of a water-insoluble substance such that the aqueous suspension is exposed to alternating flow velocities and alternating pressures for initiating dissolution of the water-insoluble substance. The flow generator may comprise a notched rotor rotatable in cooperation with a notched stator to block and open cyclically a plurality of passages for a fluid to form the flow. Apparatus may be adapted to perform a method as aforementioned.

According to another aspect there is provided apparatus for dissolving an insoluble substance in liquid, comprising a flow generator adapted to form a flow with toroidal vortices in a liquid, preferably water or an aqueous mixture, and to provide an insoluble substance to the flow, such that insoluble substance entrained in the flow is exposed to alternating flow velocities and alternating pressures, thereby initiating dissolution of the insoluble substance. The flow generator may comprise a notched rotor rotatable in cooperation with a notched stator to block and open cyclically a plurality of passages for a fluid to form the flow. The flow generator may comprise a nozzle to introduce an insoluble substance to the liquid, preferably near or downstream of where toroidal vortices are formed in the liquid. Apparatus may be adapted to perform a method as aforementioned.

According to another aspect there is provided apparatus for precipitating a solute out of a solvent, comprising a flow generator adapted to form a flow with toroidal vortices in an solution such that the solution is exposed to alternating flow velocities and alternating pressures for initiating solute precipitation.

According to another aspect there is provided apparatus for dissolving an insoluble substance in a solvent, comprising a flow generator adapted to form a flow with toroidal vortices in a mixture of an insoluble substance and a solvent such that the mixture is exposed to alternating flow velocities and alternating pressures for initiating dissolution of the insoluble substance. The flow generator may comprise a notched rotor rotatable in cooperation with a notched stator to block and open cyclically a plurality of passages for a fluid to form the flow. Apparatus may be adapted to perform a method as aforementioned.

According to another aspect there is provided apparatus for reacting a substrate in water, comprising a flow generator adapted to form a flow with toroidal vortices in an aqueous suspension or solution of a substrate such that the aqueous suspension or solution is exposed to alternating flow velocities and alternating pressures for initiating a reaction with the substrate. The flow generator may comprise a notched rotor rotatable in cooperation with a notched stator to block and open cyclically a plurality of passages for a fluid to form the flow. Apparatus may be adapted to perform a method as aforementioned.

According to another aspect there is provided apparatus for producing hydrogen from water, comprising a flow generator adapted to form a flow with toroidal vortices in water such that the water is exposed to alternating flow velocities and alternating pressures; and, downstream of the flow generator, electrodes for exposing the water to an electrical potential for initiating electrolysis of the water. The flow generator may comprise a notched rotor rotatable in cooperation with a notched stator to block and open cyclically a plurality of passages for a fluid to form the flow. The flow generator may comprise electrodes downstream of the rotor. Apparatus may be adapted to perform a method as aforementioned.

According to further aspects there is provided a method for hydrodynamic precipitation, wherein flow conditions are created in an aqueous salt solution with linear flow portions with flow speed of 2-4 meters per second, and toroidal vortices with peripheral flow speed of 200-400 meters per second. Such flow conditions can disrupt aqueous solvation of ions, for example by creating a field of centrifugal force, resulting in ion association and precipitation.

As used herein, the term 'insoluble' is preferably used to refer to solubility of least 1000 mass parts of solvent required to dissolve 1 mass part of solute, preferably at least 10000 mass parts of solvent required to dissolve 1 mass part of solute.

DESCRIPTION OF THE DRAWINGS

Example embodiments are illustrated in the accompanying figures in which.

In the drawings, like reference numerals are used to indicate like elements.

DETAILED DESCRIPTION

Figure 1:
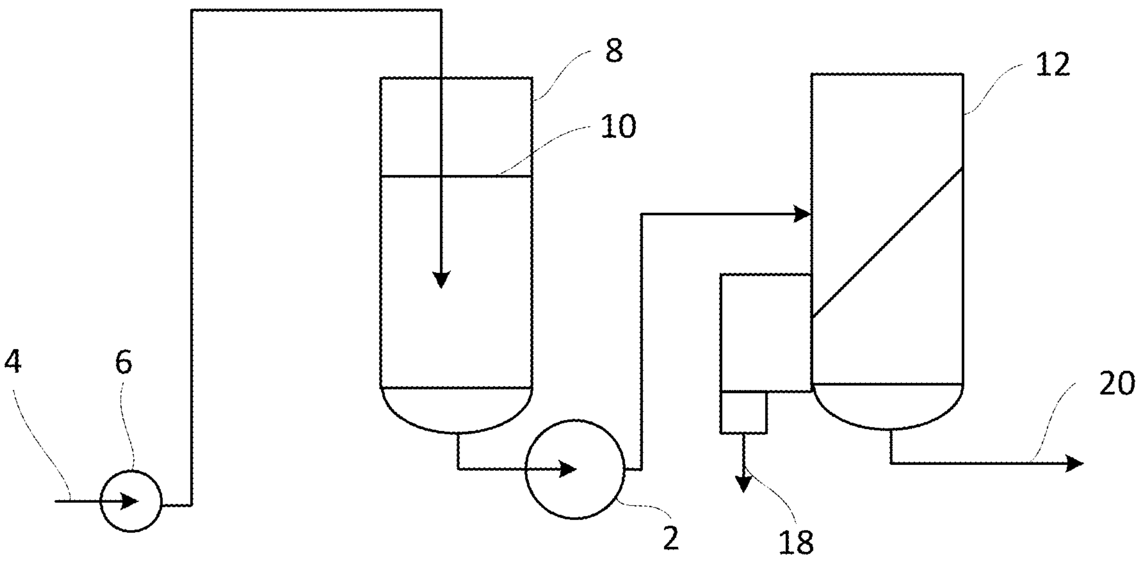
FIG. 1 shows a schematic flow diagram of a system for precipitating salts from an aqueous solution.

FIG. 1 shows a schematic flow diagram of a system for precipitation of salts from an aqueous solution. An aqueous solution 4 of one or more salts is pumped by a pump 6 to a tank 8 with liquid level 10. The solution is provided to a generator 2 where flow conditions are generated that result in precipitation of salts from the aqueous solution. The generator 2 and the flow conditions generated at the generator 2 are described in more detail below. An aqueous suspension of salt particles is formed. The suspension is flowed to a filter unit 12. The filter unit 12 separates the salt particles from the fluid. The filtered fluid 20 is with its salt content reduced. The filtered salt particles 18 can be collected.

In the generator 2 flow conditions are generated that result in precipitation of salts from the aqueous solution. In more detail, the generator 2 generates toroidal vortices in the flow. The toroidal vortices can for example have peripheral flow speeds of 200-400 meters per second, whereas the bulk fluid flow speed is for example 2-4 meters per second. The toroidal vortices can for example be 20-40 μm diameter. The flow conditions generated in the generator 2 are described in more detail below. Under the influence of these toroidal vortices the supra-molecular structure of water is affected, and the solvation of salt ions is affected.

Normally, molecular attraction forces prevail in water (Van der Waals' forces or hydrogen bonds). Water has a comparatively high relative permittivity (also referred to as a dielectric constant) of 78.7 at 298K (25° C.), a relative measure of its chemical polarity; in aqueous solutions many ions are fully solvated. For example NaCl does not form ion pairs to an appreciable extent except when the solution is very concentrated, but instead fully solvated ion-pairs are present. Even a minor change of temperature or pressure can alter physical and chemical properties of water, and in particular solubility of salts can change significantly. The generator creates flow conditions that alter pressure, fluid shear, centrifugal fields, and other forces that can affect the structure of water, and hence its performance as a solvent. Previously fully solvated ions can become associated with one another in the altered solvent environment, resulting ions of opposite electrical charge coming together and precipitate out as particles.

It is thought that the flow conditions created at the generator can disrupt hydrogen bonds in water, affecting the molecular structure of water, including in the region of an ion. It is thought that, at the toroidal vortices the structure of water can be disrupted, and a border can be formed. Instead of quasi-endless water clusters, an ion may become exposed to finite-size water clusters with a large deficit of hydrogen bonds and borders instead of continuum. Under these conditions, water can behave differently than a liquid and assume different properties. Nor does water under such conditions behave like a gas (where most of the molecules can freely rotate), as configurations typical of liquid state persist to a degree. Water is instead in a transient state. In the transient state characteristics such as relative permittivity (dielectric constant), electrical conductivity, hydrogen bond structure are different from water under ordinary conditions (i.e. in the absence of toroidal vortices).

Water in the described transient state (also referred to as 'activated' water) may no longer sufficiently solvate ions, and exposed ions may associate with one another and come together and precipitate. Even a minor local change of temperature or pressure in activated water can alter its physical and chemical properties, and in particular its solvation properties. Minute fluctuations of pressure and temperature in activated water in the flow with toroidal vortices can cause ions to precipitate out virtually completely to form inorganic salts and oxides for example. The flow is pressurised by the generator to an average fluid pressure of for example 8-12 atm, and this pressure can assist in precipitation of salt as well.

As mentioned above, water ordinarily has a comparatively high relative permittivity (dielectric constant) of 78.7 at 25° C., a relative measure of its chemical polarity. Water molecules have a certain asymmetry of intramolecular forces. The "gravity centre" of a molecule's positive and negative charges do not coincide with one another and molecules constitute a "hard" dipole, even in the absence of an external electric field. Thermal motion of molecules causes their dipole moments to be chaotically oriented in space. In the presence of an external electric field, dipole moments become oriented towards the field. Processing inside the generator disrupts such orientation; inside the generator chaotic motion of water molecules obstructs dipole orientation and increases spatial disorientation of water's dipole moments, observable in a drop in relative permittivity. Processing by the generator not only disrupts the quasi-spatial structure of water molecules but, by that token, influences the degree of orientation of its dipole moments.

A similar spatial disorientation occurs in water around the critical point, at 374° C. at 22.054 MPa. It is known that around the critical point, water assumes different properties than otherwise (e.g. water becomes compressible) and in particular assumes a lower relative permittivity, and becomes a poor solvent for electrolytes, and becomes a better solvent for nonpolar substances. A similar phenomenon initiates precipitation of calcium carbonate from tap water from 60-65° C.

The conditions created in the generator affect water in two ways:

1. Spatial disorientation of water's dipole moments.
2. Disruption of spatial quasi-structure of water owing to which transition of precipitated residue back to the solution slows down.

Following dielectric constants are observed (at ambient temperature and pressure) in distilled water and in a salt solution similar to seawater (30 g NaCl, 1.6 g $MgCl_2$, 4.1 g $MgSO_4$, 1.1 g $CaSO_4$ and 0.2 g $CaCl_2$) per 1000 g distilled water):

- distilled water, prior to treatment in generator: dielectric constant of 80-82
- salt solution similar to seawater, prior to treatment in generator: dielectric constant of 75-78
- distilled water, following treatment in generator: dielectric constant of 25-30
- salt solution similar to seawater, following treatment in generator: dielectric constant of 25-30

In the conditions created by the operation of the generator, treatment of both seawater and pure water causes the relative permittivity to drop from around 80 to 25-30, which is similar to the relative permittivity of acetone or ethanol. The time during which said value of relative permittivity persists is rather short and does not exceed 20-30 minutes, subsequent to which the relative permittivity reverses to its original level. In case precipitated salt particles are removed from the salt solution similar to seawater following treatment in the generator, the relative permittivity reverses to 79-81 consistent with the content of residual ions in the desalinated water.

In the activated solution, relative permittivity is around 25-30, similar to the relative permittivity of acetone or ethanol. The maximum solubility of NaCl in acetone and ethanol is 0.00042 g NaCl per 1 kg of acetone; or 0.65 g NaCl per 1 kg of ethanol. In the aqueous solution with relative permittivity around 25-30 the observed drop of solubility of NaCl is consistent with the expected solubility based on comparison to substance with similar relative permittivity.

The treatment can be applied to other solvent-solute systems to achieve precipitation of a solute that is ordinarily well soluble, for example for precipitating urea (polar) from dimethyl sulfoxide (polar).

The described process can be operated without high temperatures (e.g. unlike approaches involving water evaporation), for example at ambient temperature. The described process can be operated without requiring high pressures (e.g. unlike some approaches involving membrane desalination). Pre-set productivity and operating stability can be achieved. The process is suitable in small scale or decentralised processing, or for large scale processing. The process can be implemented in batches or in continuous operation. By virtue of the precipitation and separation of the precipitated particles (e.g. by filtration), water can be demineralized.

The filtration process should take place immediately after the aqueous salt solution is treated in the reaction zone, without any interruption in the flow, within 30 minutes. The flow is pressurised by the generator to an average fluid pressure of for example 8-12 atm, and this pressure can assist in filtration through a filter. Other suitable techniques may be used to separate particles from the liquid, for example centrifugation at ambient pressure and sedimentation.

The precipitation of salts from an aqueous solution can provide potable water from sea water, and can also be used in various other branches of chemical industry. For example, the described process may be used:

- To produce potable fresh water;
- To produce non-potable fresh water;
- For purification of sea, ocean, and brackish water sources
- To treat water in the thermal power sector;
- To treat water in food processing;
- To treat nuclear energy effluents and obtain concentrated radioactive isotopes and industrial-grade fresh water;
- To treat industrial and household effluents to remove dissolved inorganic salts and obtain treated water plus dry inorganic salts;
- To remove water-soluble mineral admixtures from sea and ocean waters;
- To treat water contaminated with salts from industrial or natural sources; and
- To convert inorganic salts that may be dissolved in water into a non-soluble state.

The use of generator-activated water would make for a substantial reduction of fresh water consumption for example in oil refining, petrochemicals, organic chemistry, heavy chemistry, inorganic chemistry, and pharmaceutics. For instance, in soda making, 1 ton of soda takes 40 tons of fresh water to make, while in pharmaceuticals 1 ton of salicylic acid takes 80 tons of water; the power sector is also a major consumer of desalted/demineralized water. A closed cycle of water utilization could be achieved in the power sector and in other water-using industries.

In an example agricultural fields are irrigated using demineralized water from sea sources without relying on subsurface water sources, such as ground water or artesian wells; this would help restore the environmental balance, while ground water sources and artesian wells recover and self-purify. Existing water pipelines may be available for water transport to avoid atmospheric evaporation of water delivered via open-air canals.

In another example a processing station is provided for a body of water such as a contaminated lake or river (including bodies of water that are contaminated by processes other than industrial process, e.g. by agricultural and domestic waste water, but also tailing ponds in mining operations and holding ponds in other industrial processes). A water stream from the water body is processed via the generator inlet line and fed back to the body of water.

To enhance the decontamination of water ambient atmospheric air can be simultaneously fed into the generator's reaction zone via a feed nozzle. Solubility of gases such as oxygen is low in water normally, e.g. below 2 millimole gas per 1 litre water at room temperature and ambient pressure (and is considered to be substantially insoluble for the purposes here), but in activated water gas solubility is increased. Given the generator intensifies gas dissolution, after a brief while, the water processed in the generator's reaction zone is saturated with a sizable amount of oxygen that is observed to convert into singlet oxygen $^1[O_2]$ from the more prevalent triplet ground state oxygen $O_2$. It is thought that the conditions created by the generator enable ground state oxygen to enter the higher energy singlet oxygen state. Singlet oxygen is far more reactive toward organic compounds than ground state oxygen. Singlet oxygen can also create other reactive oxygen species in water in a chain reaction. Following treatment in the generator, water is fanned back into the water body at a deep point, e.g. at the bottom of a lake, pond or river. In the contaminated water body singlet oxygen interacts, first and foremost, with chemical and biological contaminants, killing harmful germs and bacteria, and triggering decay of chemical contaminants. The generator initiates a chain reaction of water self-purification by converting a portion of atmospheric oxygen into its singlet state and by enhancing the singlet's dissolution in water. To purify a body of water, it can suffice to process 3% of its volume in order for enough singlet oxygen to be produced to trigger chain reactions. In an example, 1 to 2 kilometers downstream of the processing location a body of water is observed to start purifying rapidly.

Instead of or in addition to desalination of water, the process described above can be used to harvest salt particles with desired properties such as average size and size distribution. Particle size may vary depending on the flow conditions, the salt concentration in the solution, and how soon after water activation the particles are separated from the water. The salt particles may for example be nanocrystalline particles. Particle composition can be varied by suitable selection of ions in the solution.

Activated water can cause ion association and precipitation, but it can have other effects on other chemical species. For example the chemical polarity of activated water can change, and affect solubility of substances. Substances that are otherwise not readily soluble in water, such as some organic substances, can become dissolved in activated water. Activated water can safely and efficiently dissolve substances that are otherwise only poorly soluble in water.

A general theory of solubility of substances in water does not exist, but generally polar substances (with a comparatively high relative permittivity) are well soluble in water, and substances with low polarity (and a comparatively low relative permittivity) are not well soluble in water. In other words, generally there exists a link between a substance's relative permittivity and its solubility in water. However, this linkage is highly individual and each liquid possesses certain specifics characterizing said dependence.

As discussed above, under the conditions generated in the generator the structure of water is affected and the relative permittivity decreases, and solvent behaviour changes. Substances that are not soluble in water prior to treatment typically become more soluble (e.g. oils, benzene, non-polar organic solvents). This holds true for both solid and liquid substances; to avoid damaging the generator solids can be provided dissolved in a suitable solvent (e.g. a nonpolar solvent). Alternatively, solids can be added immediately after treatment of the solvent in the generator. The treatment can be applied to other solvent-solute systems to achieve dissolution in a solvent not otherwise able to dissolve a substance, for example for dissolving urea (polar) in benzene (nonpolar).

Activated water can also enable reactions due to the altered hydrogen bond structure of the medium. If a suitable substrate is present in the activated water, reactions of hydrolysis, hydration, creation and break-down of carbon-to-carbon bonds, and hydrogenation may occur. For example, chemical warfare agents may be destroyed by exposure to activated water.

Activated water can also enable electrolysis of water to produce hydrogen. The decomposition of water into hydrogen and oxygen at standard temperature and pressure requires an electrical potential of at least 1.23 V. Activated water is in a higher energetic state and an electrical potential below 1.23 V can suffice for the decomposition of water. In an example hydrogen is produced from activated water by electrolysis with an electrical potential of 0.5 V, 0.75 V, 1 V, 1.1 V or 1.2 V. A suitable electrical potential can depend on factors such as the conditions in the generator and the operational settings of the generator, the time elapsed following processing in the generator, and the presence of other species in the water (e.g. ions). In an example a suitable cathode and anode for electrolysis are provided downstream of the generator, or incorporated in an outlet portion of the generator, to enable electrolysis of activated water following activation. Following activation the water can be brought to ambient pressure for the electrolysis, as the activation of the water persists for some time following activation as discussed above. To promote electrolysis suitable additives such as electrolytes may be added to the water, before or after activation of the water, depending on whether or not the electrolyte is likely to undergo reactions in the generator (e.g. hydrolysis, hydration, creation or break-down of carbon-to-carbon bonds, or hydrogenation). To accelerate electrolysis it may be desired to apply an electrical potential that is higher than the minimum necessary. In any case the electrical power input for electrolysis of activated water is lower than it would be to achieve the same effect in water prior to treatment in the generator.

Activated water can also boil at a lower temperature than water prior to activation, under the same conditions otherwise. At standard pressure (101 kPa) ordinarily water boils at 100° C. Activated water is in a higher energetic state and requires a lower heat input to change to vapour. It is estimated that at standard pressure activated water can boil at around 15 to 20° C. lower than prior to activation, so for example at 75° C., 80° C., 85° C., 90° C. or 95° C. A boiling temperature of activated water at standard pressure can depend on factors such as the conditions in the generator and the operational settings of the generator, the time elapsed following processing in the generator, and the presence of other species in the water. Following activation the water can be brought to ambient pressure for boiling, as the activation of the water persists for some time following activation as discussed above. In any case the energy input for boiling activated water is up to 15-25% lower than it would be to boil it, under the same pressure condition, prior to treatment in the generator. Accordingly, the vapour pressure of activated water is higher than of untreated water at the same pressure and temperature.

By the same effect water can boil at a higher pressure for a given temperature. At for example 80° C. ordinarily water boils at 47 kPa. Activated water is in a higher energetic state and boiling occurs at a higher pressure; for example activated water at 80° C. may boil at 101 kPa.

Conversely, at standard pressure ordinarily water freezes at 0° C. Activated water is in a higher energetic state and requires a greater heat loss to freeze. It is estimated that at standard pressure activated water can freeze at around 15 to 20° C. lower than prior to activation, so for example at −25° C., −20° C., −15° C., −10° C. or −5° C. A freezing temperature of activated water at standard pressure can depend on factors such as the conditions in the generator and the operational settings of the generator, the time elapsed following processing in the generator, and the presence of other species in the water. Following activation the water can be brought to ambient pressure for freezing, as the activation of the water persists for some time following activation as discussed above. In any case the energy that must be released or removed in order to freeze activated water is expected to be up to 15-25% greater than it would be to freeze it prior to its treatment in the generator, under the same pressure condition.

The effect of activation on boiling and freezing temperature and vapour pressure is described with reference to water, but applies similarly to other liquids such as ethanol or acetone.

Reducing the initial boiling temperature and, importantly, increasing the rate and intensity of evaporation can be particularly useful in generating electric and thermal energy using any thermal medium, for instance water. Increased evaporation at a lower temperature can lead to a proportionate increase in energy efficiency with respect to heating requirements, for instance by 15-20%. Overall, operating the generator and investing less energy in heating may provide an increased efficiency factor with simultaneous reduction in the total costs of generating vapour. In producing electric and thermal energy this can be particularly effective. Atmospheric discharge of heat losses can be reduced.

An example of the performance of the system illustrated in FIG. 1 is now provided, in which precipitation of salts from water is achieved.

TABLE 1

Table 1: measurement of properties and masses at various process stages. Performance results for sea water treatment.

| | Mass, grams | Refraction | Density at 20° C., kg/m$^3$ | pH | Dry residue, mg/L |
|---|---|---|---|---|---|
| Source fresh water | 1000 | 1.33410 | 998.6 | 7.4 | 498 |
| Substances added to water: | | | | | |
| NaCl | 30.00 | | | | |
| $MgCl_2$ | 1.6 | | | | |
| $MgSO_4$ | 4.1 | | | | |
| $CaSO_4$ | 1.1 | | | | |
| $CaCl_2$ | 0.2 | | | | |
| Total | 37.0 | | | | |
| Water following introduction of additives | 1036.9 | 1.33986 | 1026.5 | 8.2 | 37251 |
| Water, 10-30 minutes after processing and filtration | — | 1.32217 | 946.8 | — | — |
| Water, 60 minutes after processing and filtration | — | 1.33486 | 998.8 | 6.8 | 826 |
| Filtrate residue after drying | 36.70 | — | — | — | — |
| Losses | 0.36 g (1%) | — | — | — | — |

The data in Table 1 reflects an example where known quantities of a number of salts are added to source fresh water and then precipitation of salts from an aqueous solution is performed by providing the solution to a generator. In the generator flow conditions are generated that result in precipitation of salts from the aqueous solution. Subsequently filtration is performed to separate the aqueous suspension of salt particles. The weight of the salts added to source fresh water is 37.0 g, compared to 36.7 g of salts that are recovered as filtrate residue after drying. The index of refraction, density, pH and dry residue weight per volume is determined for the source fresh water, the source fresh water with salts added, and the solution at various time points after precipitation and filtration of salt particles. It is calculated that around 99% of the salts added to the water are precipitated and filtered out.

An example of experimental data demonstrating the effect of treatment in the generator on boiling temperature of water is now provided.

A standard setup is used for determining boiling temperature, the setup including:

a 4 kilowatt heater, a boiling bulb with a working volume of 0.5 litre, a mercury thermometer accurate to 0.01° C., a refrigerator connected to the bulb, and a drain tank mounted at the end of the refrigerator.

500 ml of water previously treated in a generator at 20° C. is poured into the bulb; following installation of a drain tank, refrigerator and thermometer, the heater is turned on and a standard method is used to determine the initial boiling temperature of water at ambient pressure. The time elapsed between treatment in the generator and transfer to the bulb is 10-15 minutes. It is observed that the first drop that shaped up at the end of the thermometer's mercury element and dropped back into the bulb did so at 79.6° C. For reference, untreated water is tested by the same procedure, and it is observed that the first drop that shaped up at the end of the thermometer's mercury element and dropped back into the bulb at 100.1° C. In this example if the heater is left on 15% (75 ml) of the treated water is distilled before the standard water boiling temperature of 100.1° C. The remainder of the water was distilled at 100.1° C.

In another experiment using substantially the same setup as the previous experiment a generator (powered by a 0.75 kilowatt electric motor) is located directly inside the boiling bulb with 500 ml of water, to reduce the delay between treatment and transfer to the bulb. As the generator is turned on, the water acquires a milky colour. 75% of the water (375 ml) is distilled at 80-85° C. In this example the remainder of the water could not be distilled from the bulb due to the fluid level dropping below the generator offtake level. The rate of distillation is higher by a factor of 4.7 compared to the rate of distillation of untreated water under the same conditions otherwise.

In another larger scale experiment a system with an 80 $m^3$ capacity (previously checked for air-tightness and leaks) is filled with 50 $m^3$ of water. The water is treated in a generator by way of a circulation loop. Heat is supplied to heat up the water while treatment of the water in the circulation loop is maintained. It is observed that water begins to distil at 80° C. and that the rate of distillation is 60-100 I/min.

After disconnecting the generator and while maintaining the heat supply to the water, the flow of water from the refrigerator stopped. The flow of water from the refrigerator resumes when the temperature in the water reached 100° C. The discharge velocity of evaporated water is 10 I/min.

In all experiments, water treated in the generator forms significantly more vapour per unit of water surface than untreated water. For reference, ordinary atmospheric distillation that is performed with a surplus of energy (by a factor of 4 or 5) supplied to untreated water was also investigated, and it is observed that the rate of evaporation is significantly (by a factor of 3 or 4) lower than for water treated by the generator.

An example of experimental data demonstrating the effect of treatment in the generator on boiling temperature of a liquid other than water is now provided. instead of water, saturated hydrocarbon decane $C_{10}H_{22}$ is investigated. Decane has a molecular mass of 142.29 gram-mol, a density of 0.73 gram-mol, and a boiling temperature of 174.1° C. at standard conditions.

Using substantially the same setup as described above, 500 ml of decane is poured into the bulb, the heater is turned on, and a laboratory generator immersed deep in the decane is turned on. The initial boiling point of the treated decane is observed at 92° C., and 75% of the decane was distilled prior to 110° C. Further distillation was stopped due to the level of decane in the bulb dropping below the offtake level. The distillation rate using the generator (as verified by the rate at which the drain tank downstream of the refrigerator was filled) was higher by a factor of 8-12 compared to untreated decane. A test of the properties of the distilled decane on a chromatograph confirmed that the decane did not contain any additional impurities. This evidences that the principle whereby the generator impacts such completely different fluids as polar water and non-polar decane is the same.

In another example a system for producing oil bitumen is used to test distillation of petroleum tar with a boiling temperature exceeding 420° C. At refineries, petroleum tar is formed as residue following distillation of oil under vacuum at Hg 20-40 mm of mercury and at 420° C. at ambient pressure. In the system, at 250° C. and ambient pressure and the generator turned on, petroleum tar began to be distilled as darkened liquid hydrocarbons were formed. A check of the boiling temperature of the distilled liquid fraction showed an initial boiling temperature of 440-445° C. at ambient pressure.

Under the influence of the generator water and hydrocarbons vapours form at lower temperatures than their standard boiling temperature.

Generator

The following description of the generator 36 used for precipitating salt will be discussed below with reference to FIGS. 2 to 23.

Figure 2:
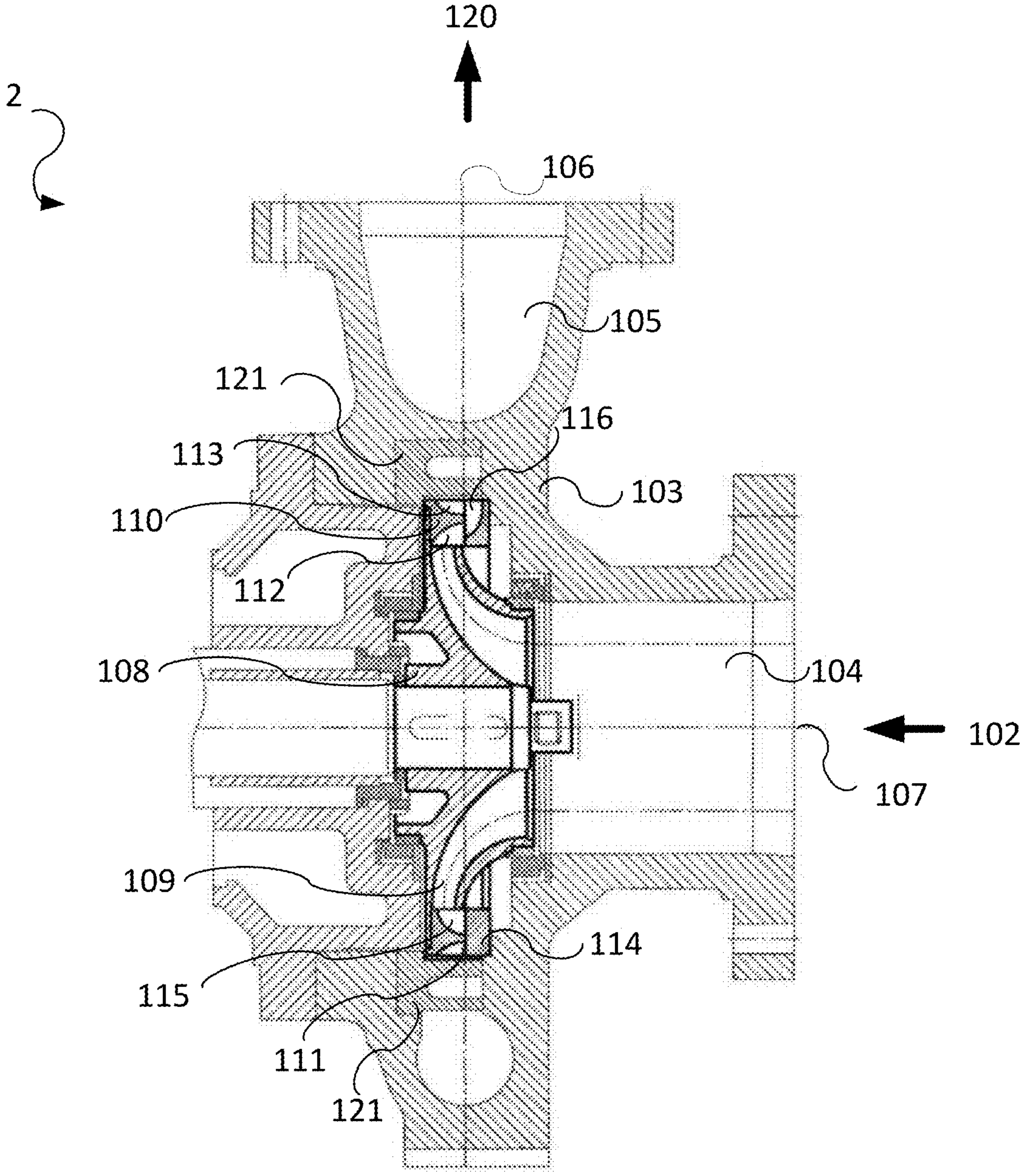
FIG. 2 shows a cross sectional view of a generator.

FIG. 2 illustrates a cross sectional view of a generator 36 for generating toroid and spatial vortices in a liquid 102. As used herein, the term 'spatial vortex' is used to distinguish non-toroid vortices from toroid vortices, and includes vortices where the axis of rotation does not form a closed loop (e.g. tubular vortices, cone-shaped vortices). The generator 36 comprises: a substantially rotationally symmetrical stator housing 103, symmetrical about axis 107; an axial inlet opening 104, an eccentric outlet opening 105 directed in a plane 106 that is normal to axis 107, and a rotor 108 rotatable around axis 107 in the stator housing 103, the rotor 108 comprising radially outwardly extending channels 109 in constant fluid connection to the inlet opening 104. In an example, the rotor 108 has an outer diameter of about 30 cm±20%.

Figure 3:
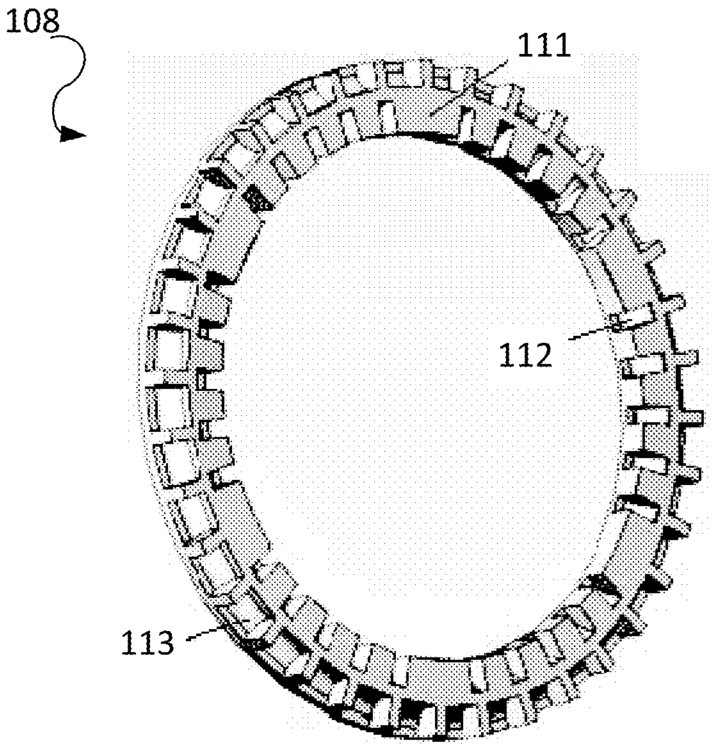
FIG. 3 illustrates a perspective view of a rotor disc of a generator.
Figure 4:
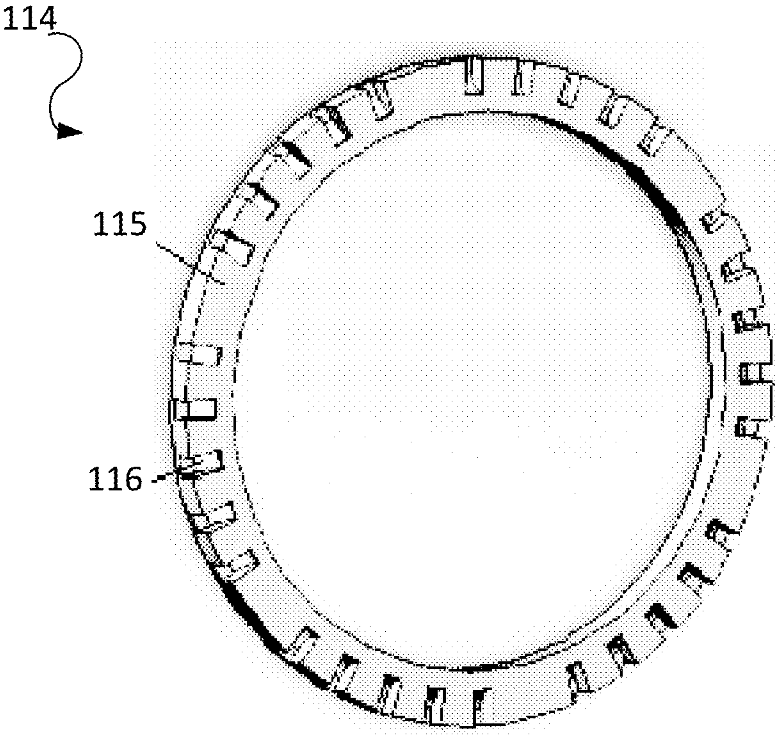
FIG. 4 illustrates a perspective view of a stator disc of a generator.

The generator further comprises a rotor disc 110 (also referred to as a rotor ring) and a stator disc 114 (also referred to as a stator ring) rotatable about axis 107. FIGS. 3 and 4 illustrate a perspective view of a rotor disc 110 and a stator disc 114 of a generator 36 respectively. Inner notches 112 are arranged periodically about the rotor disc 110, and notches 116 are arranged periodically about the stator disc 114.

The rotor disc 110, shown in FIG. 3, is attached to the rotor 108 in a rotationally fixed manner radially outside the rotor 108. The rotor disc 110 comprises a side surface 111 normal to axis 107 with inner notches 112, spaced apart from one another and equidistant from the axis 107 for channeling a liquid 102. The rotor disc 110 may additionally comprise outer notches 113 on the same surface 111 as the inner notches 112. These outer notches 113 can also be spaced apart from one another and equidistant from the axis 107. It should be appreciated that the rotor disc 110 may be provided as a separate part that is distinct from the rotor 108, or it may equally be provided as an integral feature or portion of the rotor 108.

The rotor disc 110 also includes outer notches 113. By virtue of the outer notches 113 the building of toroid vortices within the periodical liquid flow 119 is further increased before the liquid 102 exits the rotor disc 110.

The stator disc 114, shown in FIG. 4, is attached with torque proof connection to the stator housing 103. The stator disc 114 comprises a side surface 115 configured to face the side surface 111 of the rotor disc 110 as well as stator notches 116 spaced apart from one another and spaced equidistantly around axis 107. It should be appreciated that the stator disc 114 may be provided as a separate part that is distinct from the stator housing 103, or it may equally be provided as an integral feature or portion of the stator housing 103.

The number of each kind of notch 112, 113, 116 determines the throughput of liquid and is preferably between 16 and 42, although it will be appreciated that any number of notches can be used. It is not necessary for the notches 112, 113, 116 to be arranged equidistant from one another on the discs 110, 114, but it is preferred. The number of the inner notches 112 may equal the number of the outer notches 113 and/or the number of the stator notches 116. This is the case illustrated in FIGS. 3 and 4.

The generator 36 may further comprise a guide vane 121 inside the stator housing 103 radially outside the stator disc 114 and rotor disc 110 for guiding a total liquid flow 120 to the eccentric outlet opening 105. Passages radially outside of the stator disc 114 to the outlet opening 105 are provided by the spiral guide vane 121, with blades bent in the opposite direction to the impeller blades. At the nearest point to the rotor and stator discs the guide vanes leave only a very small gap.

Figure 5:
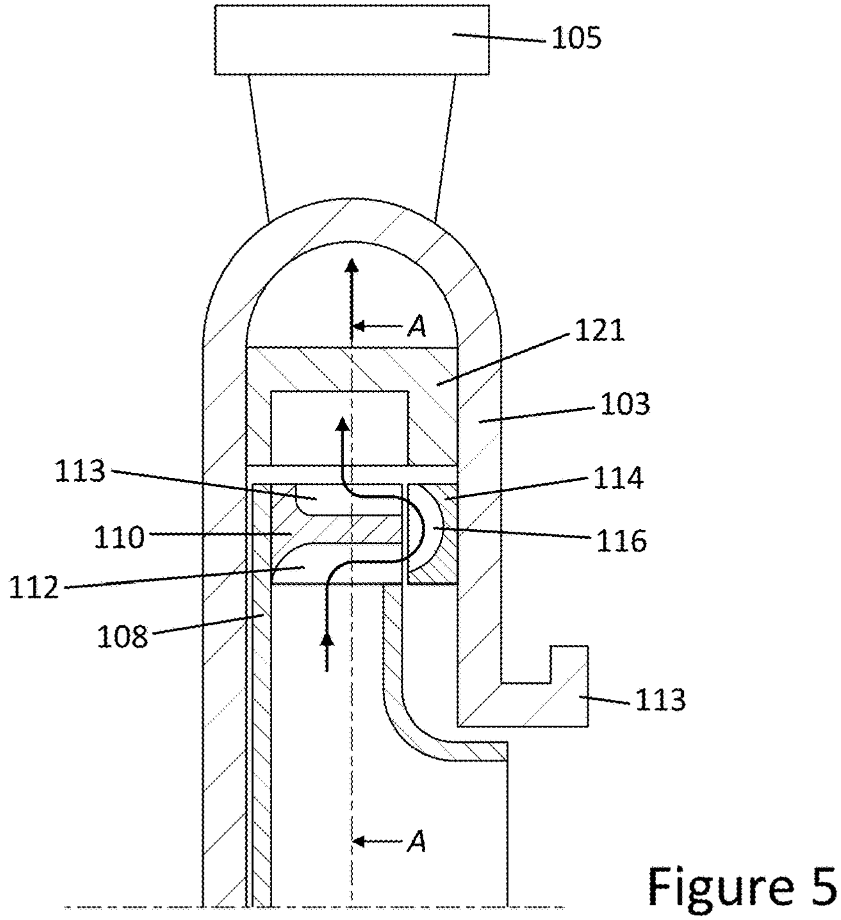
FIG. 5 shows a cross sectional view of a portion of the generator of FIG. 2.
Figure 6:
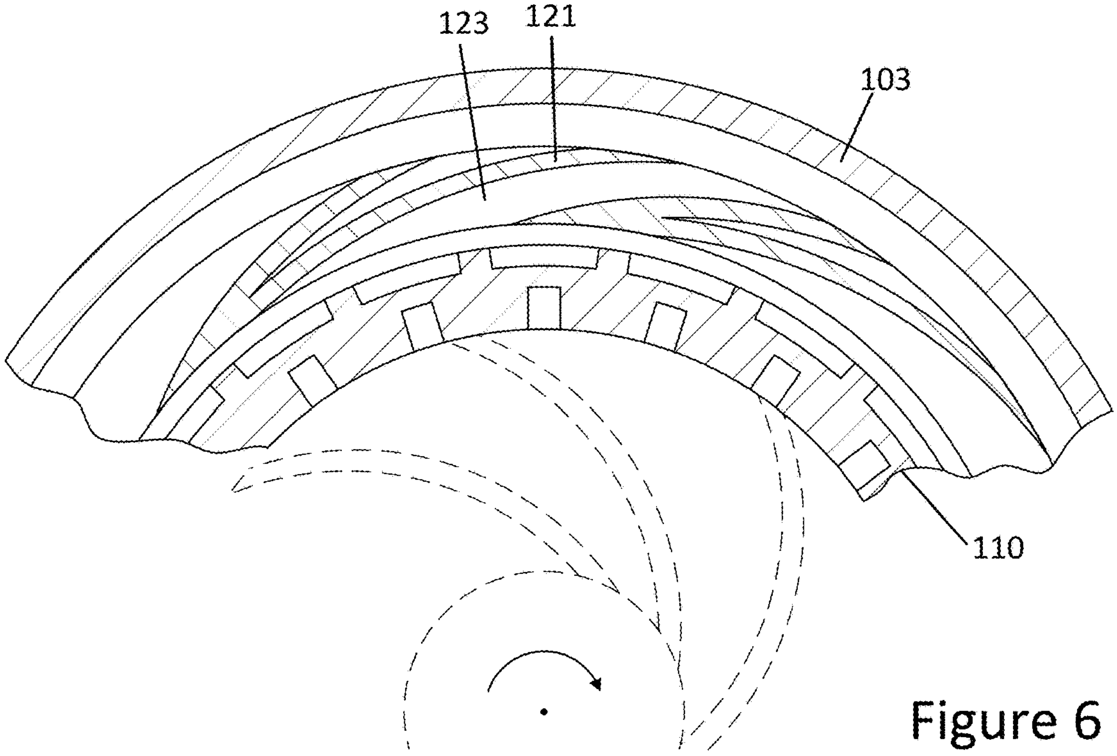
FIG. 6 shows a cross sectional view along the section A-A of FIG. 5.
Figure 7:
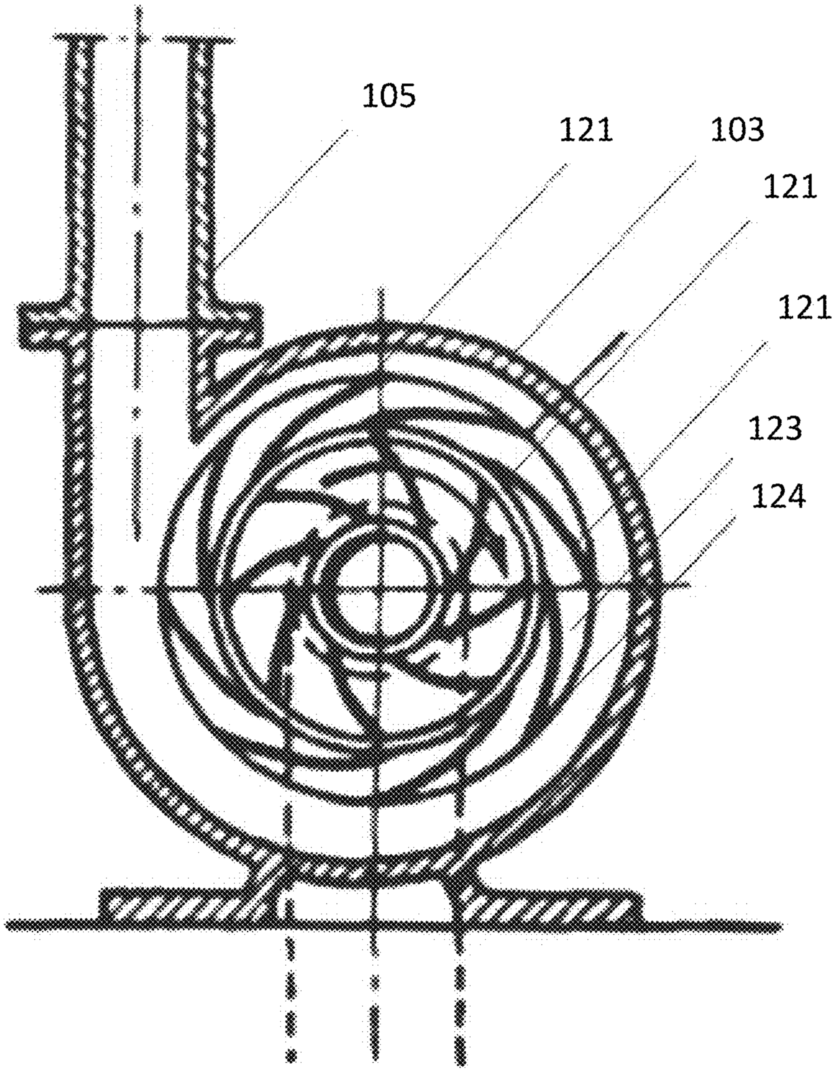
FIG. 7 shows a cross sectional view of a generator with outlet duct.

FIGS. 5 and 6 show the vanes 121 arranged in the stator housing 103 providing passages 123 for the flow downstream of the stator disc 114 and rotor disc 110. FIG. 7 shows the guide vanes 121 feeding into the pump's spiral discharge duct 124 leading to the outlet opening 105, as is well known in the art. The liquid exiting the stator disc 114 and rotor disc 110 passes through the passages 123 between the evenly spaced guide vanes 121 to enter the pump's spiral discharge duct 124 and exits the generator via the outlet opening 105.

The guide vanes 121 are intended to reduce the velocity of liquid exiting the stator disc 114 and rotor disc 110. In this context, the stream's kinetic energy is partially converted into pressure energy, with the pressure at the guide vane exit greater than the pressure at the entry thereto. The vanes can be optimized to meet specific desired operating parameters for a pump. The vanes can promote vortices staying intact downstream of the rotor/stator discs, for up to 3 to 5 meters within the discharge pipeline.

Figure 8:
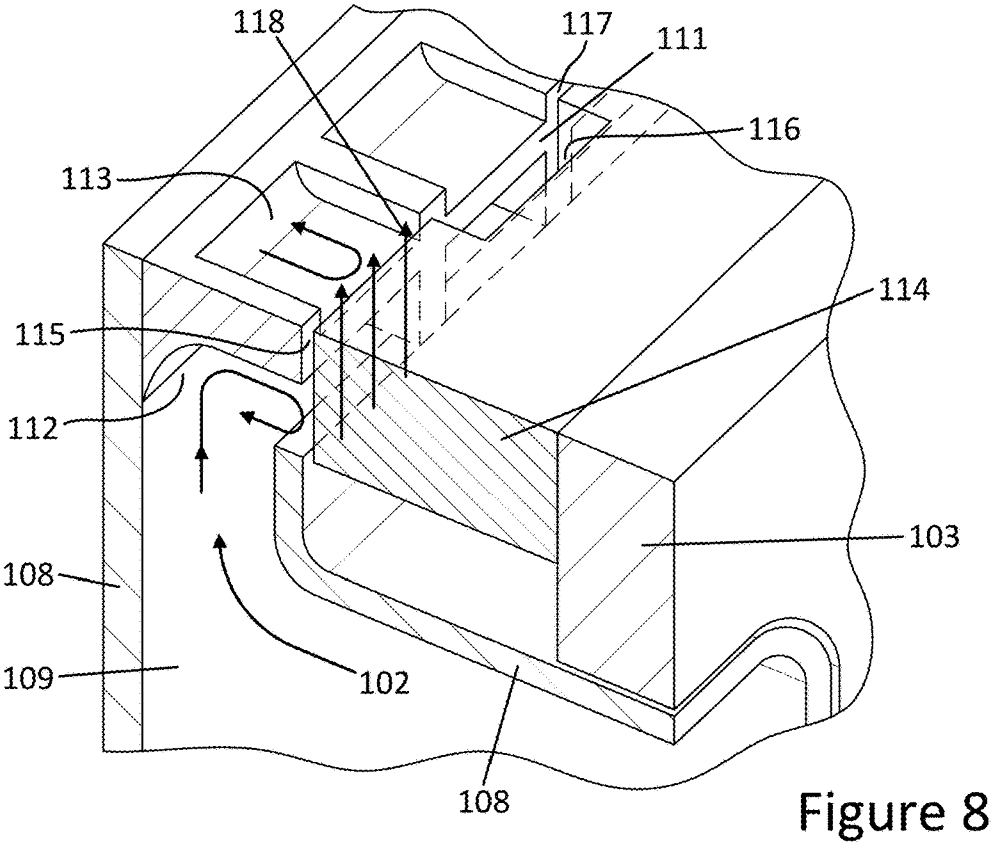
FIG. 8 illustrates a perspective view of a permanent flow generated by conditions in a generator.
Figure 9:
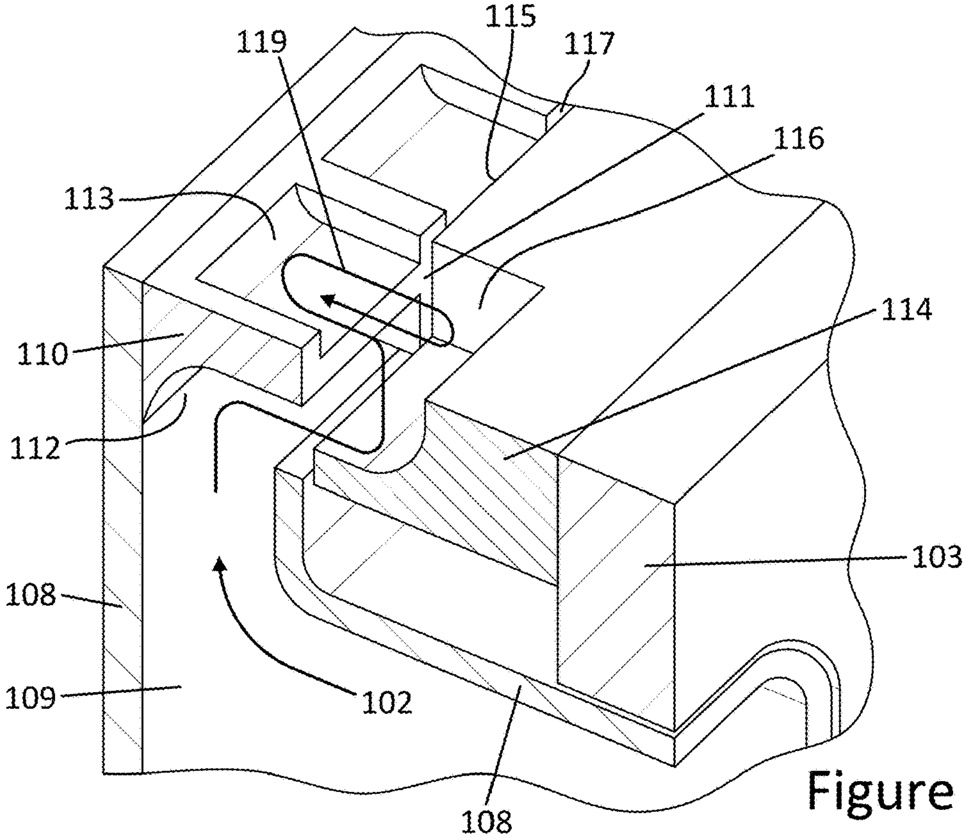
FIG. 9 illustrates a perspective view of a periodical flow generated by conditions in a generator.

FIGS. 8 and 9 illustrate perspective views of a permanent flow 118 and a periodic flow 119 generated by conditions in a generator 36 respectively. In particular, FIGS. 8 and 9 illustrate how the conditions change as the rotor disc 110 and the stator disc 114 move relative to one another. A permanent flow 118 flows in a direction illustrated by arrows in FIG. 8 and flows perpendicular to a periodic flow 119 illustrated by an arrow in FIG. 9. Manipulation of these flows helps to create toroid vortices in the liquid 102.

A permanent liquid flow 118 between the discs 110, 114 flows between the flat parallel side surface 111, 115 of rotor disc 110 and stator disc 114 and moves in a constant radial direction, independent of the positioning of the notches 112, 116. The rotor disc 110 and the stator disc 114 are spaced apart by a gap 117. This gap 117 allows a liquid flow, defined as the permanent flow 118, through from the inner notches 112 to the outlet opening 105. The gap 117 provides for spatial vortices to be generated in the liquid flow, in use, due to the velocity difference between the opposing side surfaces 111, 115, which define the gap 117, and due to periodical disruptions by the portioned liquid 102 passing through the gap 117 in an axial direction from the centre of the discs outward as illustrated by arrows 118 in FIG. 8. This permanent liquid flow 118 contributes between 5% and 30% of the total liquid flow 120 through the generator 36 depending on the size of the gap 117. In some examples the gap 117 between the rotor disc 110 and stator disc 114 is preferably between 0.8 mm and 1.2 mm wide. In other examples the gap 117 between the rotor disc 110 and stator disc 114 is between 1 mm and 1.8 mm wide. This permanent liquid flow 118 is independent of the actual position of the rotor 108.

Inner and outer notches 112, 113 of the rotor disc 110 and stator notches 116 of the stator disc 114 provide volumes in which to form a periodic liquid flow 119 of liquid 102. The periodic liquid flow 119 flows between the inner notches 112 and the stator notches 116 as illustrated, for example, in FIG. 9. When the inner notches 112 and stator notches 116 are aligned, the liquid 102 flows from the inner notches 112 to the stator notches 116, forming the periodic flow 119. Portions of liquid 102 pass back and forth from the inner notches 112 to the stator notches 116 caused by a change in volume as the rotor 108 rotates and the notches 112, 113, 116 successively align and misalign with each other. The periodic flow 119 helps to generate toroid vortices in the portioned liquid 102 by shear stress.

Liquid 102 leaves the rotor 108 to enter the inner notches 112 of rotor disc 110 when it is opposite the stator notch 116 of stator disc 114; it has roughly the same linear peripheral speed until the rotor disc 110 rotates to a position opposite the enclosed space between the notches 112, 113, 116. At that point, the passage for liquid 102 to exit the chamber of the rotor disc notch 112 closes off. This produces a pressure spike in liquid in the inner notch 112 of rotor disc 110 until an exit for the liquid 102 via a notch 116 in the stator ring 114 opens again, due to rotation, and the liquid 102 is able to flow into the stator notch 116.

FIG. 8 illustrates the case after the closure point of the flow from an inner notch 112 to a stator notch 116. The periodical flow becomes further accelerated; a portion of the flow turns 180° and begins to move in the opposite direction to the principal flow within the inner notches 112, taking the shape of a twisted flow and forming a stable vortex braid 122 along the full length of the inner notches 112, which partially enters the stator notch 116.

Further rotation of the rotor disc 110 partially opens the flow passage from the inner notches 112 into the stator notches 116. Given that the opening is still very narrow, the space for the vortex braid flow 122 becomes tight, and the braid begins to break up into toroid vortex pieces. The toroid vortices so generated enter the stator notches 116, where the shape of the notches shapes the vortices into separate toroid vortices.

As the flow passage from the inner notches 112 to the stator notches 116 then gradually widens, each stator notch 116 is filled with a screw-like vortex braid that, once the total flow of liquid reverses its direction 180°, breaks up into portions, generating similar toroid vortices.

The time period when the stator notches 116 are fully aligned with the inner notches 112 is very brief, as the rotor disc 110 rotates at around 3000 revolutions per minute (50 Hz). The frequency of rotation can be adjusted to achieve variations in pressure experienced by the liquid 102. The rotor's continued rotation tightens the spaces for the vortex braid, as the inner notches 112 gradually close. This promotes continued breakup of the vortex braid into toroid vortices.

As the rotor disc 110 rotates and the stator notches 116 are closed off from the inner notches 112 again, the entire process repeats, submitting the liquid 102 to high frequency alternating flow velocities and pressures. Rotation of the rotor ring creates a suction effect and draws fluid in.

The generator 36 can be used for generating toroid and spatial vortices in a liquid 102, by: guiding the liquid 102 to the inlet opening 104 and rotating the rotor 108 with the attached rotor disc 110 to produce a permanent liquid flow 118 and a periodical liquid flow 119 between the stator disc 114 and the rotor disc 110 as described above.

Toroid vortices are generated in the portioned liquid 102 of the periodic liquid flow 119 by shear stress as the portions of liquid 102 pass from the inner notches 112 to the stator notches 116 and move back and forth therebetween. Further, spatial vortices are generated in the permanent liquid flow 118 in the gap 117 between the side surfaces 111, 115 due to the velocity difference of the side surfaces 111, 115 and due to periodical disruptions by the portioned liquid 102 passing the gap 117 in the axial direction.

Figure 12:
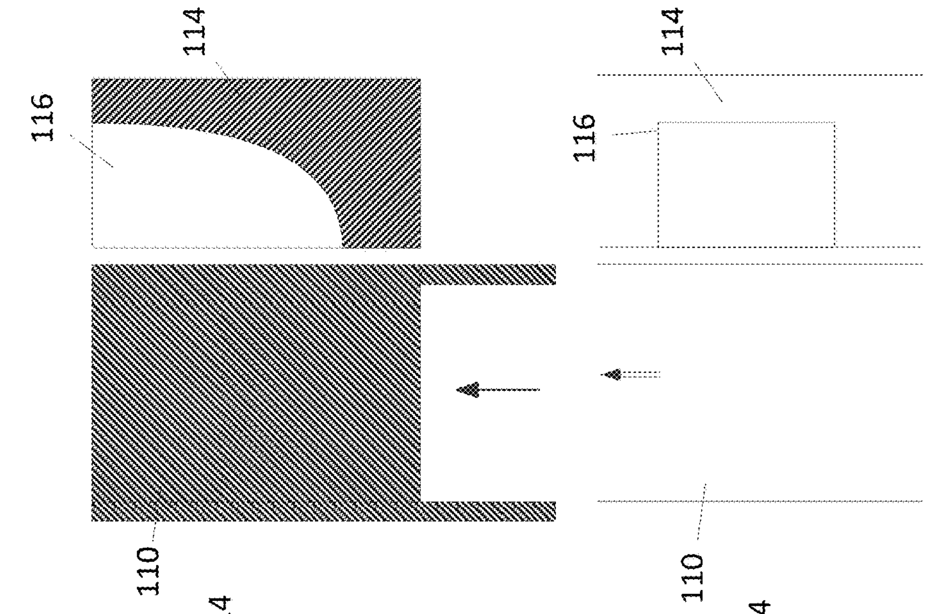
FIG. 12 shows a sectional and plan view schematic of flows when a stator notch has no overlap with a rotor notch.
Figure 11:
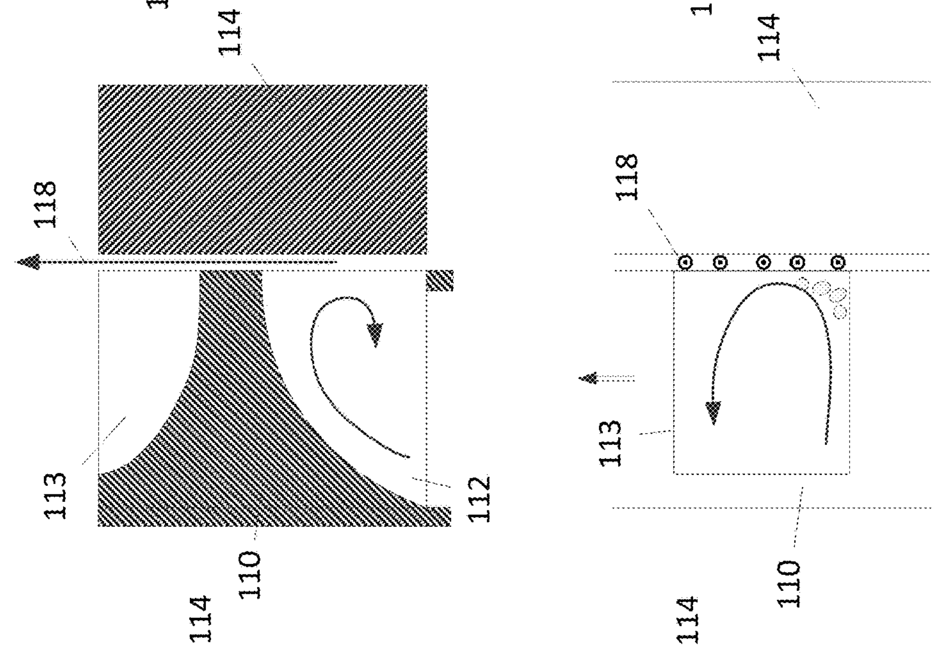
FIG. 11 shows a sectional and plan view schematic of flows when a rotor notch has no overlap with a stator notch.
Figure 10:
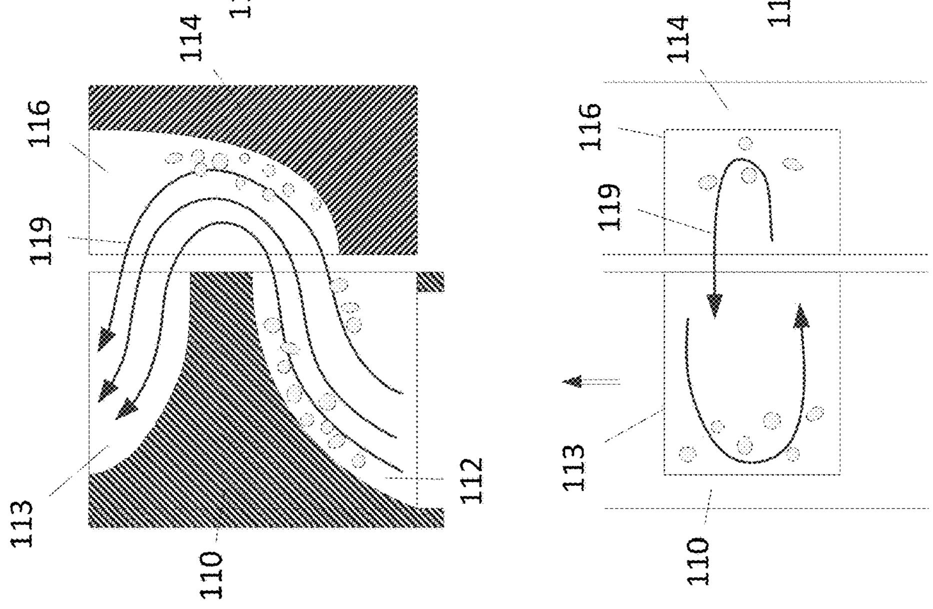
FIG. 10 shows a sectional and plan view schematic of flows when a stator notch is aligned with a rotor notch.

FIGS. 10, 11 and 12 illustrate the flows between the stator disc 110 and the rotor disc 114 in different configurations in more detail. FIG. 10 shows the flows when a stator notch is aligned with a rotor notch, in sectional and plan views. FIG.

11 shows the flows when a rotor notch has no overlap with a stator notch, in sectional and plan views. FIG. 12 shows the flows when a stator notch has no overlap with an inner rotor notch, in sectional and plan views. In the configuration shown in FIG. 12 it can be seen that in the sections between inner rotor notches fluid is blocked from entering the gap between rotor ring and stator ring. Liquid flow can only exit via an inner rotor notch, as illustrated in FIGS. 10 and 11.

FIG. 10 shows a number of vortices being formed in the periodic flow 19 due to shear along the various notch surfaces of the rotor and stator rings. Liquid flows into the inner rotor notch 112, is redirected in the inner rotor notch 112 toward the stator 114, enters the stator notch 114, and is redirected in the stator notch 114. In the illustrated example the flow can enter the outer rotor notch 113 but in other examples the outer rotor notch 113 is omitted and the flow is redirected out of the stator notch 114. In the illustrated examples the notches provide curved surfaces to redirect the flow in the inner rotor notches 112 by approximately 60-90°, and also to redirect the flow in the stator notches 114 by 60-120° or by approximately 60-90° depending on whether or not outer rotor notches 113 are provided. As the flow moves through the notches a number of toroid vortices are formed perpendicular to the liquid flow. The redirections in the notches cause flow shearing and produce vortex zones within the notches.

FIG. 11 shows the permanent liquid flow 118 between the discs 110, 114 that gets squeezed up between the flat parallel side surface 111, 115 of rotor disc 110 and stator disc 114 and moves radially. The permanent liquid flow 118 is affected by shear stresses the rotor disc 110 generates as it moves vis-à-vis the stator disc 114.

The outer notches 112 continuously disrupt the linear nature of the inter-disc flow 118 and generate spatial vortices therein. The permanent liquid flow 118 is further disturbed by vortex flows as the inner notches 112 start to line up with the stator notches 116 and provide a flow path that passes from the inner notches 112 to the stator notches 116 perpendicular to that permanent liquid flow 118.

Figure 13A:
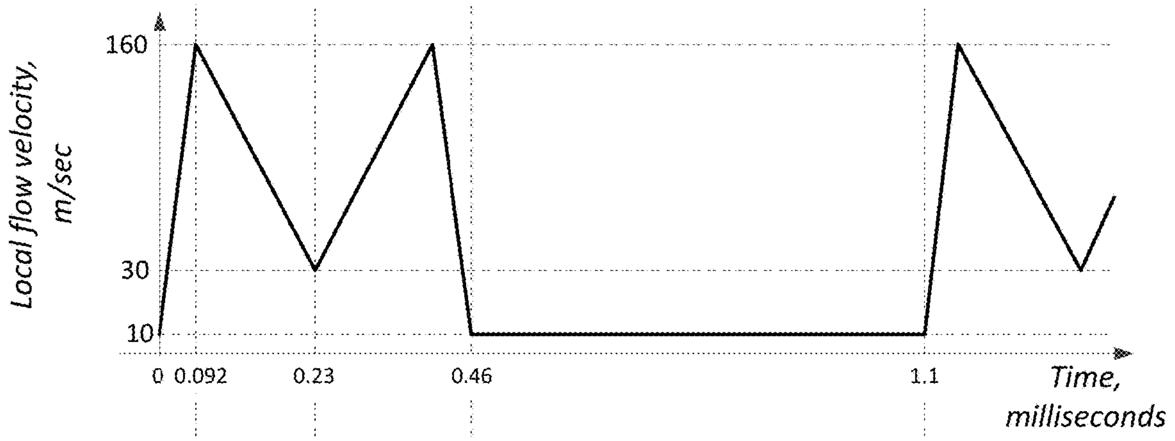
FIGS. 13*a*, 13*b* and 13*c* show graphs of local flow velocity, acceleration and absolute pressure in flow in a generator during different phases of operation.
Figure 13B:
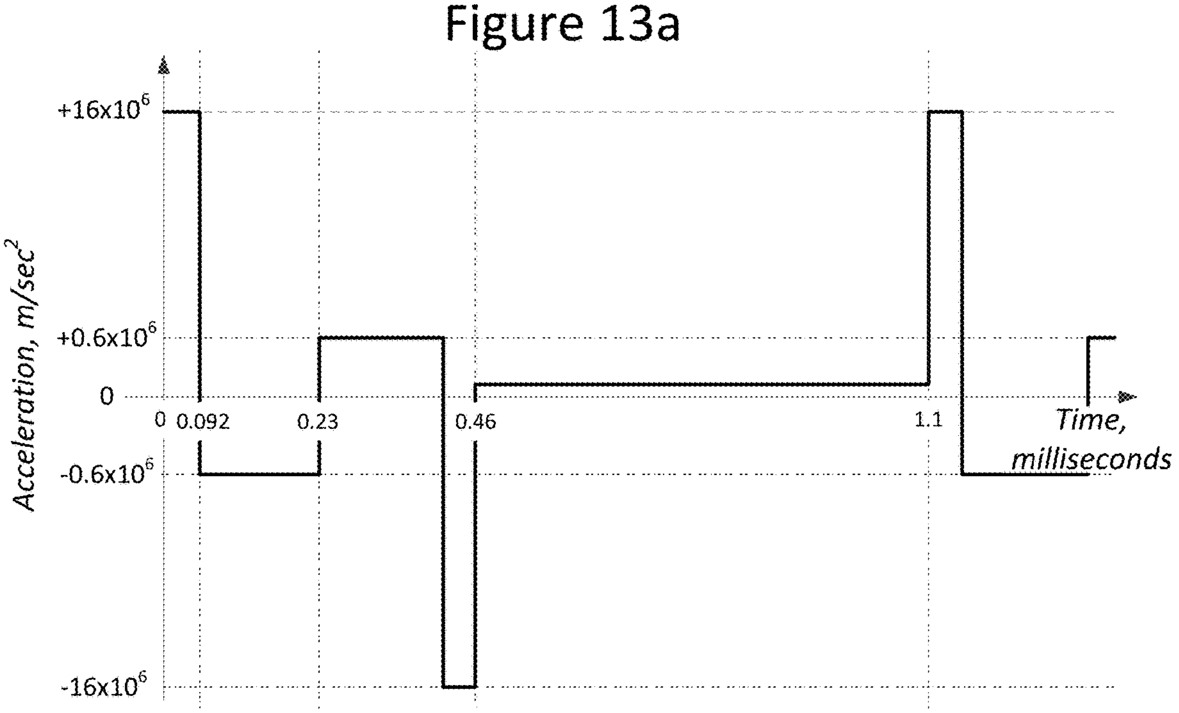
Figure 13C:
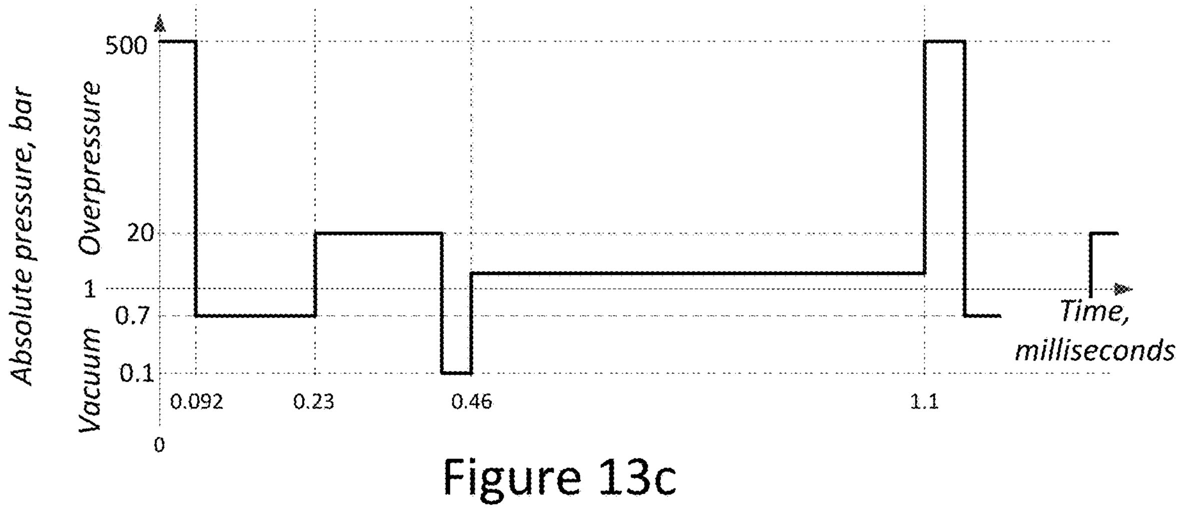

FIGS. 13*a*, 13*b* and 13*c* show graphs of local flow velocity, acceleration and absolute pressure in flow in an exemplary generator during different phases of operation.

Some of the details of the exemplary generator are as follows:

Pump capacity, Q=200 $m^3$/hour
Pressure head, H=12 atmospheres (1216 kPa)
Impeller speed, n=3,000 revolutions per minute
Outer diameter of the impeller, D=0.32 m
Impeller width, h=0.025 m
Number of impeller blades, a=6
Guide vane channel 0.040 m by 0.035 m
Rotor ring parameters:
Number of rotor inner notches, $N_p$=18
Rotor inner notch width, $h_p$=0.025 m
Rotor inner notch height, $L_p$=0.015 m
Rotor inner notch depth, $a_p$=0.025 m
Stator ring parameters:
Number of stator notches, $n_c$=18
Stator notch width, $h_c$=0.025 m
Stator notch height, $L_c$=0.020 m
Stator notch depth, $a_c$=0.020 m
Gap between the frontal surfaces of the rotor and stator rings, B=0.001 m The graphs in FIGS. 13*a*, 13*b* and 13*c* show flow conditions immediately downstream from the rotor ring/stator ring passage, from t=0 just before a rotor ring inner notch 112 starts to line up with a stator notch 116, continuing until the rotor ring notch fully opens (i.e. is in alignment with a stator notch) and further until the rotor ring notch closes.

As the notch 112 starts to open up, over a duration of 0.000092 seconds (0.092 milliseconds), flow velocity increase from 10 to 160-200 meters per second (m/sec). As the rotor ring notch then comes into full alignment, over a duration of 0.00023 seconds, flow velocity drops to 30 m/sec. Subsequent movements of the rotor ring result in continued progressive closure of the notch, boosting the flow velocity to 160-200 m/sec. With further rotation of the rotor ring, the notch closes (i.e. it no longer is located at a stator notch), and the flow velocity (from flow through the gap 117) drops to 10 m/sec. As the rotor ring continues to rotate, the notch 112 is in its closed configuration (with only flow through the gap 117) for 0.00064 second. The notch 112 remains in its open configuration (fully or partially lined up with a stator notch) for 0.00046 second.

Such rapid changes in flow velocity occasioned by rotor ring rotation within the same time period produce significant alternating accelerations of the flow that change from +16,000,000 to −16,000,000 m/$sec^2$. Such accelerations affect the liquid within the rotor ring notch and the slot-like gap between the rotor and stator rings.

The forces that develop in the process produce pressure in a portion of liquid flow, which varies from 500 bar (50 Megapascal MPa or 510 atmosphere atm) overpressure to 0.1 bar (0.01 MPa) vacuum over a period of 0.00046 seconds. In a 0.000092 second timespan the pressure drops from 500 bar (50 MPa) overpressure to 0.7 bar (0.07 MPa) vacuum. Such rapid pressure changes, from overpressure to vacuum and back, can be very effective at initiating precipitation.

In some examples, depending on the generator design, the maximum local pressure in a toroid vortex may reach 200-400 kg/$cm^2$ (around 20-40 MPa) and flow velocity change per unit of time (acceleration) is 50,000 G (around 490,000 m/$sec^2$).

The permanent liquid flow 118 is disturbed by vortex flows that pass from the inner notches 112 to the stator notches 116 perpendicular to the permanent liquid flow 118. In this context, the permanent liquid flow 118 is affected by shear stresses the rotor disc 110 generates as it moves in relation to the freely attached stator disc 114 that is blocked to prevent its rotation. The notches 112, 113 in the rotor disc's side surface 111 continuously disrupt the linear nature of inter-disc flow along the permanent liquid flow 118 and generate spatial vortices therein.

A conical funnel-shaped spatial vortex forms in at a rotor ring notch as the stator ring blocks the flow exit from the rotor ring. As the rotor ring exit is closed off, the outside portion of the vortex braid produces a maximum diameter funnel and unfolds towards the rotor ring entrance.

As those spatial vortices come into contact with toroid vortices, first from the inner notches 112 and then from the stator notches 116, they morph into yet smaller and more intense toroid vortices and, along with toroid vortices from the stator disc notches 112, are dispersed in total flow 120 and carried out into a discharge system. Alternating flow velocities may be produced using this technique at a frequency of at least 500 Hz, for example. Alternating pressures may also be produced using this technique at a frequency of at least 500 Hz, for example.

Contact between spatial vortices in the permanent liquid flow 118 and the spatial vortex braid for the periodical flow 119 exiting the stator notches 116 as they fully open help to cause the toroid vortices to stabilise. As the two flows 118,

119 mix, they generate a total liquid flow 120 featuring an internal volume comprising a plurality of toroid vortices.

Peripheral liquid flow velocity in a toroid vortex is greater than that of the fluid outside the toroid vortex. For example, peripheral flow velocity in a toroid vertex may be between 5 and 10 times that of the flow velocity outside the toroid vertex. Peripheral flow velocities of liquid flow in a toroid vortex may be at least 100 m/s, for example, 200 m/s to 400 m/s. Pressure of a toroid vortex may also be greater than the pressure in the fluid outside the toroid vortex. Local pressures of at least 500 kPa may be achieved.

At 3000 revolutions of the rotor ring per minute, and from 12 to 48 notches on the rotor ring, the vortex braid generation process is near enough continuous to be effectively continuous. The spatial vortexes formed in the chamber comprised by rotor ring notches and stator ring notches may be deemed stable, and their number deemed consistent with the number of notches, i.e., 12 to 48; in their turn, the spatial vortexes produce a large number of smaller toroid vortexes with a typical torus diameter of 20-40 micrometres. The vortex braid breaks down into toroid vortexes typically ranging from 20 to 40 micrometres in diameter. Larger and smaller toroid vortexes are present as well, but in lower numbers. As the toroid vortexes travel in the flow they gradually dissipate and shrink. In an example at a distance of 3 meters from the outlet port of the generator 20-40 micrometre vortexes are still found in the pipeline. At that point smaller vortexes may have dissipated and may not be observed, whereas larger vortexes may have split into smaller ones and coincide in the 20-40 micrometre size. The toroidal vortices may have a typical diameter of at least 10 μm, preferably at least 20 μm, further preferably at least 40 μm. The toroidal vortices may have a typical diameter of up to 100 μm, preferably up to 70 μm, further preferably up to 50 μm. Preferably the toroidal vortices are micrometer-scale toroidal vortices.

In an example the rotor ring rotates at 40-60 Hz and has 16-42 notches to generate toroid vortices at 640 to 2520 Hz. In this example 256-1764 vortices are produced per revolution. In addition to such primary vortexes formed at a primary frequency, secondary vortexes are formed with an integral multiple frequency (integer N=2, 4, 6, 8), but the efficiency of those secondary vortexes is significantly less compared to efficiency of the primary vortexes. In an example where the generator throughput is about 160-240 $m^3$/hour, a density of around 190-3000 primary vortices may be generated per litre of fluid. The flow may include at least 150, preferably at least 200, further preferably at least 500 toroidal vortices per litre of suspension. The flow may include 200 to 3000 toroidal vortices per litre of suspension or 190-2940 toroidal vortices per litre of suspension.

As described above, under such conditions, in particular due to the liquid in the permanent liquid flow 118 and the sudden change of direction in the periodical liquid flow 119 (in a direction perpendicular to the permanent liquid flow 118), a vortex is built and the liquid 102 forms toroid currents therein. The liquid 102 is subjected to resulting high frequency alternating pressures and flow velocities. Conditions experienced in the liquid 102 permit low-temperature evaporation.

The generator's productivity does not fall due to the emergence of a water slickness effect. Disruption of the quasi-spatial structure of water also results in localised reduction of viscosity of the fluid, which makes up for apparent loss of productivity in the generator.

Figure 14:
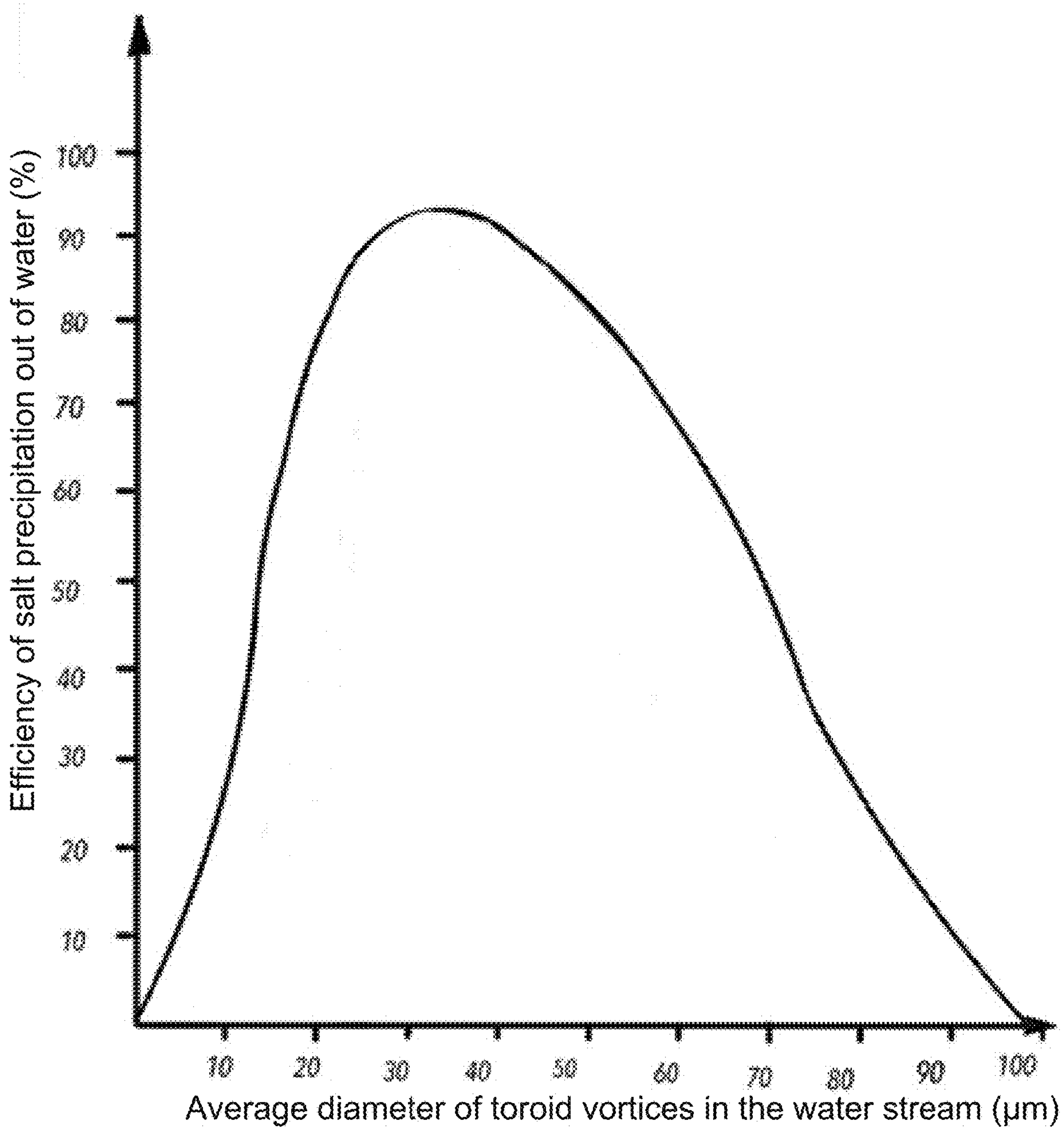
FIG. 14 shows a graph comparing diameter of toroidal vortices against efficiency of salt precipitation.

FIG. 14 shows a graph comparing diameter of toroidal vortices against efficiency of salt precipitation. Efficiencies over 90% (i.e. causing over 90% by mass of salts to precipitate from the solution) are achieved when the average diameter of toroidal vortices is in the region of around 25-40 micrometres. At significantly lower or higher average diameters the efficiency of salt precipitation decreases.

Figure 15:
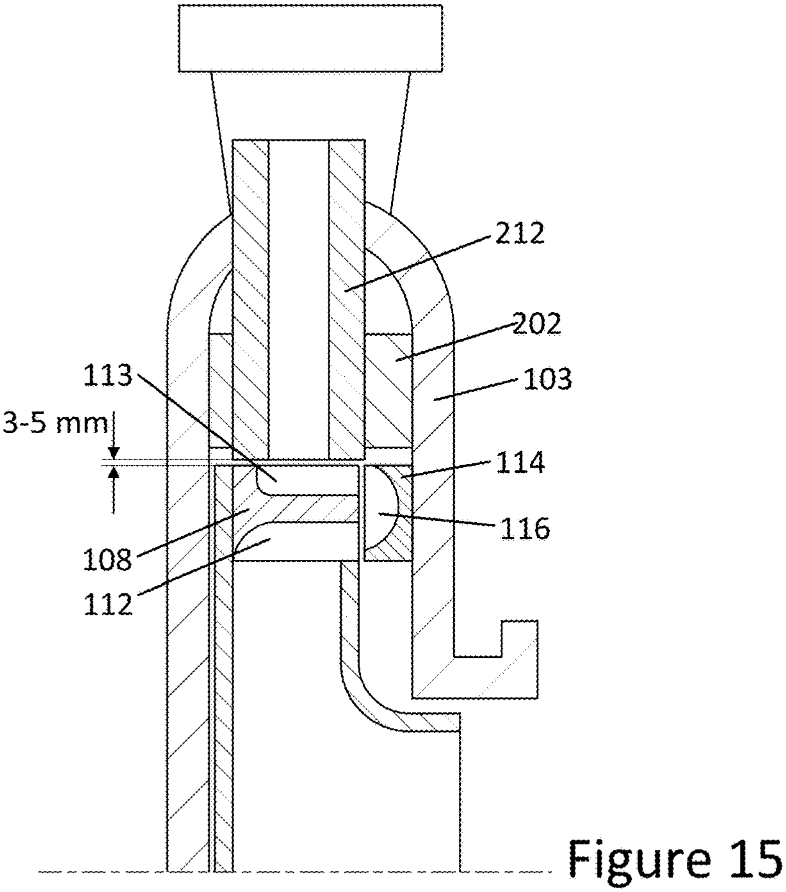
FIG. 15 shows a cross sectional side view of a generator with a nozzle.
Figure 16:
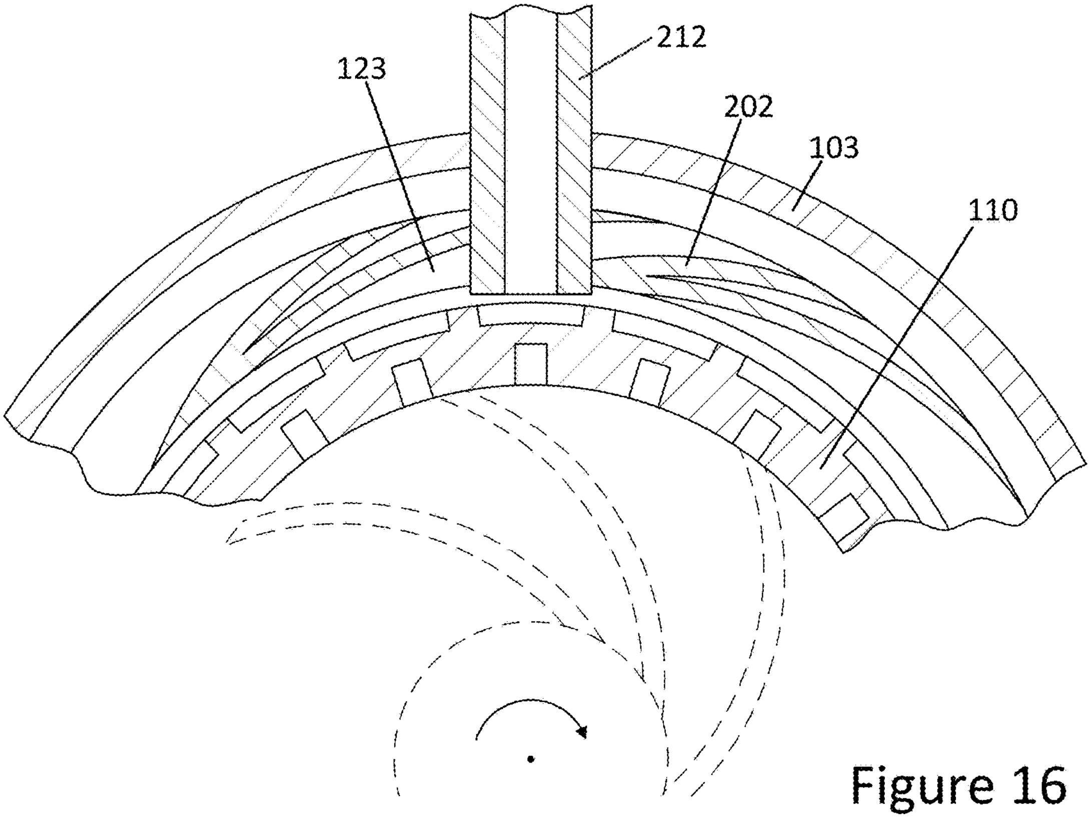
FIG. 16 shows a cross sectional front view of the generator with a nozzle of FIG. 15.

FIGS. 15 and 16 show a nozzle 212 that can be included in a generator in order to introduce gases such as air into the flow.

As described above, the liquid enters the generator 36 at the inlet of the generator. Gas, e.g. air, can be introduced to the liquid via a special nozzle that can be provided for this purpose in the generator. The nozzle serves to deliver gas to the generator such that the gas contacts liquid as the latter leaves the stator and rotor ring structures. The end of the nozzle 212 that delivers gas to the flow is situated in proximity to the rotor ring 108 and stator ring 114 assembly such that gas leaving the nozzle 212 contacts liquid as it leaves the rotor ring 108 and stator ring 114 assembly. Nozzles of various design and configuration may be used. Movement of the rotor ring's upper portion creates suction within the generator, which draws fluid through the nozzle 212 and into the fluid flow.

A guide vane 202 is seen in FIGS. 15 and 16; such guide vanes are fixed relative to the housing and can define fluid flows from the pump's impeller to its discharge line. A guide vane is not an essential element and it may be omitted. In the illustrated example the nozzle 212 passes through a guide vane 202; the nozzle 212 is not connected to the guide vane 202 and the nozzle can be provided in the absence of a guide vane.

In the illustrated example one nozzle is provided on the circumference of the rotor/stator ring assembly. In other examples two or more nozzles are distributed around the circumference of the rotor/stator ring assembly.

The diameter of the nozzle outlet is less than the width of an outer notch of the rotor ring. The centre of the nozzle outlet is aligned with the centre of the outer notches of the rotor ring.

The nozzle outlet is located 2-3 mm from the external blades of the rotor ring to enable this suction effect to act on the gas in the nozzle. Movement of the rotor ring's upper portion creates an atmospheric vacuum zone of 0.2-0.6 atm, which ensures continuous suction of gas into the flow.

Figure 17:
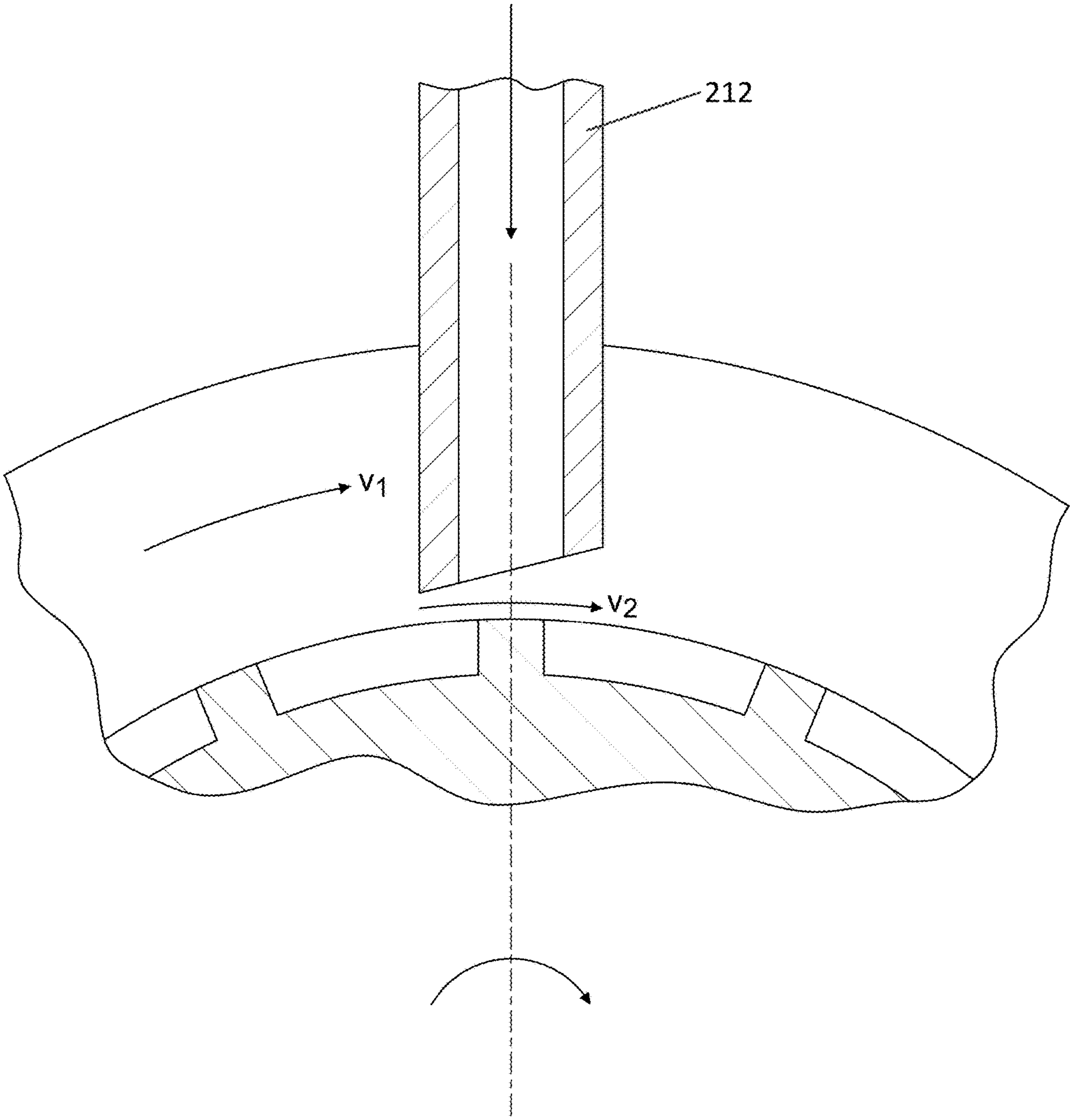
FIG. 17 shows another nozzle.

FIG. 17 illustrates another configuration of a nozzle 212, with an angled outlet plane. FIG. 17 also indicates two speeds at different positions in the housing outside the rotor/stator rings: $v_1$ outside the rotor ring but prior to the nozzle, and $v_2$ between the nozzle outlet and the rotor ring. As the nozzle obstructs flow outside the rotor ring and only permits flow to pass in the gap between the nozzle and the rotor ring, in those different positions the flow speed is different, due to the different flow cross section areas. In an example it is calculated that $v_1$=10 m/sec and $v_2$=133 m/sec. The different flow speeds give rise to the Venturi effect, and the zone in the gap between the nozzle outlet and the rotor ring is at a relatively lower pressure, causing entrainment of the gas from the nozzle into the flow.

The outer surface of the rotor ring moves at a greater speed than $v_1$. As the rotor ring rotates, vortexes are generated and destroyed within the stator ring notches and outer rotor notches with high intensity. This too can cause a low-pressure zone near the nozzle, similar to a vortex pump with the rotor ring acting as a vortex impeller; the rotation of the rotor also assists in drawing gas from the nozzle into the flow. In an example water from the depth of 5 to 8 meters could be lifted through the nozzle thanks to a vacuum of about 200-500 mm Hg or about 50-80 kPa at the nozzle outlet, which is generated by the synergy between the Venturi effect and the operation of the rotor ring notches.

In general gas is provided (or, equivalently "injected") at a pressure below the average pressure of the liquid flow at the nozzle outlet, to prevent disruption of the flow produced by the generator and to prevent formation of gas bubbles in the liquid stream.

The nozzle delivers gas to the flow; in the conditions created by the generator dissociation of oxygen molecules provides a source of singlet oxygen as described above. It will be appreciated that generally the nozzle can permit introducing a second fluid into the primary flow. For example a fluid that is heterogenous in respect to the primary flow, or a slurry or dispersion of a solid in a liquid, or a flowable solid such a powder can by introduced into the primary flow by way of the nozzle. This can permit introduction of a wide variety of substances via the nozzle into the primary flow, for dissolution or for reaction, for example.

The example provided above discusses a rotor rotating with 3000 revolutions per minute (RPM)±20%, and having an outer diameter of the rotor and the rotor disc and stator disc of about 30 cm±20%. It should be appreciated that a toroid vortex dispersion can similarly be created at lower or higher RPM provided the rotor's diameter is suitably increased or decreased. For instance, in a generator with an outer diameter of the rotor and the rotor disc and stator disc of about 45 cm, a suitable rotor rotation speed is around 2000 revolutions per minute. In a generator with an outer diameter of the rotor and the rotor disc and stator disc of about 90 cm, a suitable rotor rotation speed is around 1000 revolutions per minute. In all of these examples, the peripheral speed (tangential speed) of the rotating rotor, at the rotor disc (e.g. at an inlet to the rotor disc, or at an outer edge of the rotor disc), is around 47 m/sec. For a generator to produce a toroid vortex dispersion effectively, the peripheral speed of the rotor, at the rotor disc, is preferably 30 m/sec or more. A peripheral speed in the range from 20-29 m/sec is borderline and may be unstable or ineffective, though it may permit formation of a toroid vortex dispersion. A peripheral speed in the range from 15-19 m/sec may in some configurations (e.g. in otherwise particularly effective configurations) permit formation of a toroid vortex dispersion.

In some of the examples provided above the inner notches and the outer notches of the rotor ring are aligned with one another, e.g. as seen in FIGS. 8 and 9; in others they are not aligned, e.g. as seen in FIG. 3, or some are aligned and others are not. In some of the examples provided above the inner notches and the outer notches of the rotor ring have the same or similar widths; in other examples the inner notches and the outer notches of the rotor ring do not have the same widths, e.g. as seen in FIG. 9 where the inner notches are narrow than the outer notches.

Figure 18:
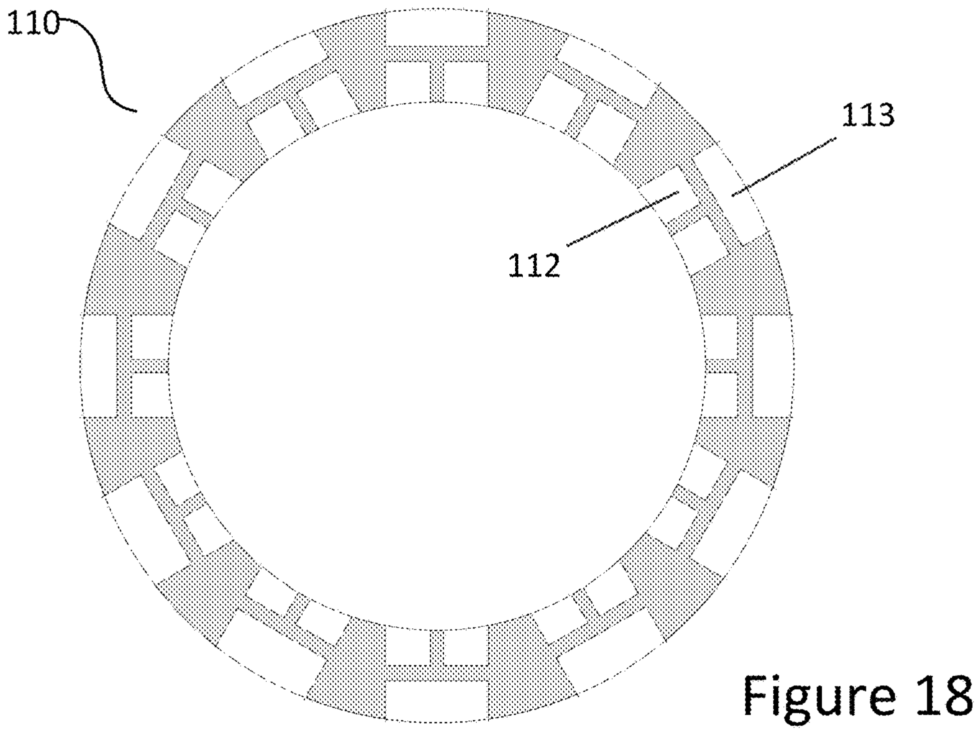
FIG. 18 shows a schematic illustration of another rotor ring.
Figure 19:
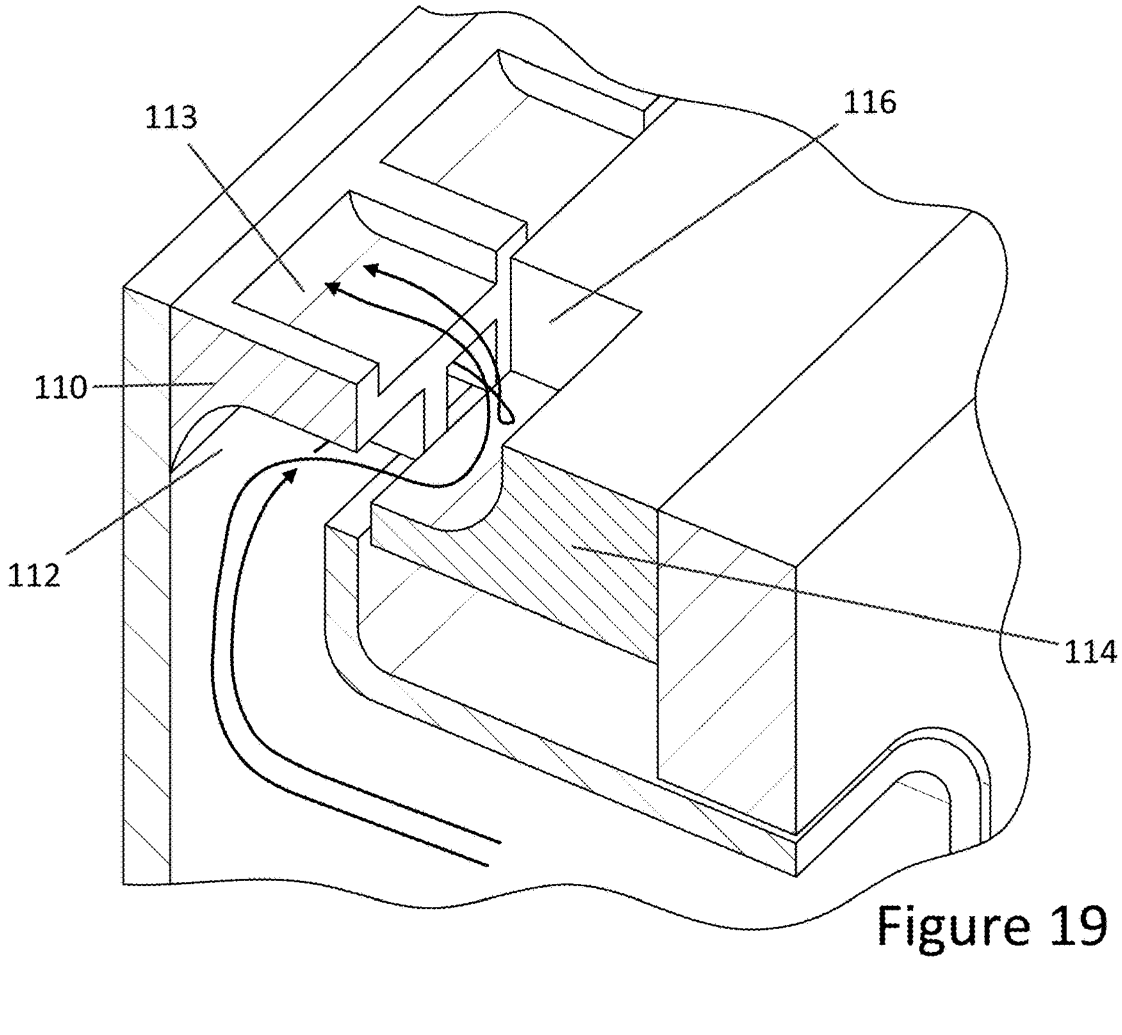
FIG. 19 shows a perspective drawing of flows with the rotor ring of FIG. 18.

FIG. 18 shows another arrangement of notches that is observed to be particularly effective at creating a flow of toroid vortexes. FIG. 19 illustrates the rotor ring of FIG. 18 with a stator ring 114 in a generator. In this rotor ring 110, one outer notch 113 spans two inner notches 112. In the stator ring 114 the stator notches 116 are such that a stator notch 116 spans two inner notches 112. A stator notch 116 may be same or similar width as an outer rotor notch 113.

FIG. 19 illustrates some flow paths in the generator with the rotor ring 110 of FIG. 18. Flow from a pair of inner notches 112 of the rotor ring 110 is directed to a common rotor notch 116 of rotor ring 114. Each inner notch 112 is formed to channel liquid at an angle to its neighboring notch, such that a pair of inner notches 112 that face the same outer notch 113 channel fluid toward a common area. The central flow axes of a pair of inner notches are at a converging angle to one another; the angle is such that a point of intersection of the two flow axis is inside the volume of the notch of the stator ring, as illustrated in FIG. 19.

Movement of the rotor ring 110 is now considered, starting from when two inner rotor notches 112 of the rotor ring 110 are fully aligned with a stator notch 116 of the stator ring 116, as seen in FIG. 19. As the rotor ring moves, one of the pair of inner notches remains fully open, while the other of the pair of inner notches becomes partially closed. In this instant, the flow speed via the partially obstructed inner notch is significantly higher than the flow speed via the fully open inner notch. The two flows interact in the stator notch. The presence of an angle between these flows causes the faster flow to accelerate the slower flow.

With the notch design of FIGS. 18 and 19, the points of maximum speeds are shifted compared against the velocity plot shown in FIG. 13*a*. What is more, the maximum flow velocity is significantly increased due to the cumulative effect of contact between two vortex braids with subsequent significant positive and negative acceleration. The number of toroid vortexes generated in the system increases exponentially, and their total peripheral speed significantly increases compared to those described above with reference to FIGS. 13*a*, 13*b* and 13*c*.

The examples illustrated in FIGS. 18 and 19 provide stator notches spanning two inner notches so as to commingle the periodic flows from two inner notches in a stator notch. It should be appreciated that a stator notch need not span exactly two inner notches; it may for example be sized to span more, or less, than two inner notches. In an alternative one stator notch spans one inner notch as illustrated in e.g. FIGS. 3 and 4, but the outer notches 116 are sized so as to span two stator notches. In this way the periodic flow from two stator notches is commingled in an outer notch. Flow interactions are promoted, and the number of toroid vortices generated is increased.

Figure 20:
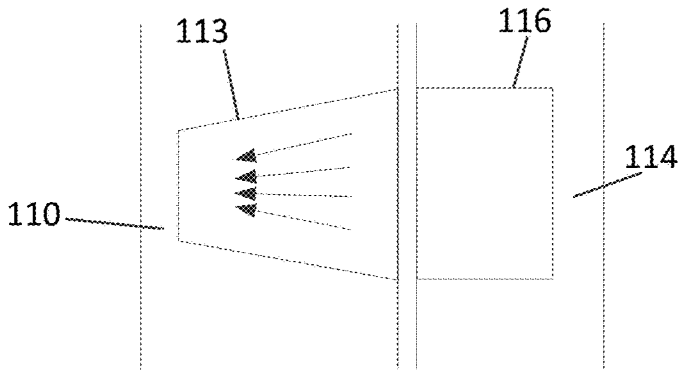
FIG. 20 shows a schematic view of another rotor ring.
Figure 21:
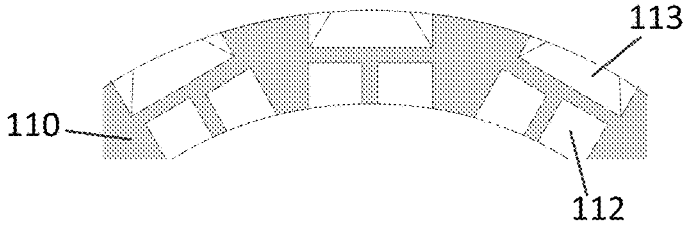
FIG. 21 shows another view of the rotor ring of FIG. 20.

FIGS. 20 and 21 show plan and front view schematics of outer rotor notches 113 with a bottleneck design. In the examples previously illustrated, the outer notches of the rotor ring have approximately parallel side walls, as seen e.g. in FIG. 8. As shown in FIGS. 20 and 21 the exit section of the outer notches 113 of the rotor ring 110 may be formed to provide channels that are progressively narrower and with smaller flow area and that resemble a bottleneck. The liquid is compressed as it moves along these channels. Flow speeds are increased as are flow interactions, and the number of toroid vortices generated is increased.

Figure 22:
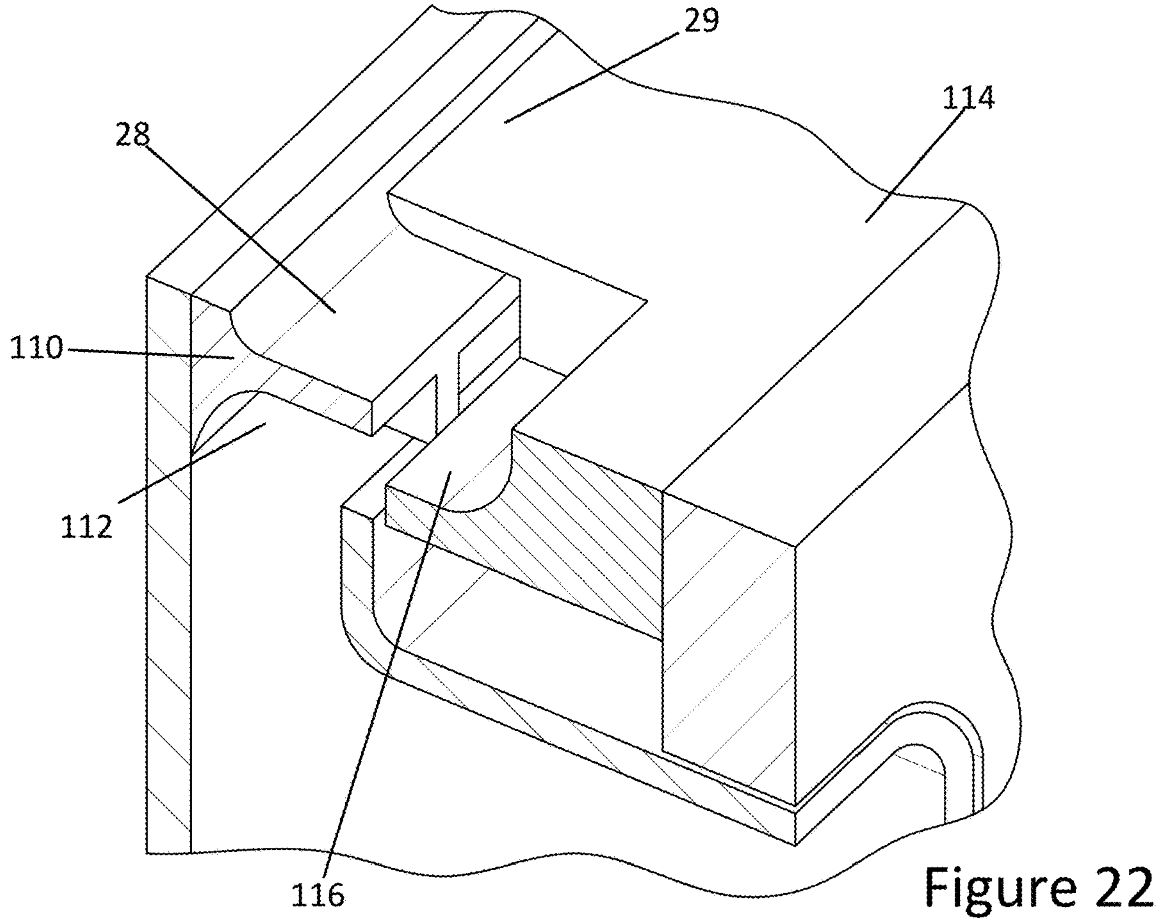
FIG. 22 shows a perspective drawing of another rotor ring and stator ring.

FIG. 22 shows a variant where the rotor ring 110 does not provide outer notches. Instead, the outside part of the rotor ring constitutes an outer surface 28 shaped like a carved-out toroid with a certain curvature; the cross section of the outer surface 28 is same as or similar to the cross section of an outer notch, such that the outer surface 28 can provide a redirection of the flow similar to the outer notches as described above. The stator 114 includes prongs 29 between the stator notches 116 that project toward the outer surface 28 of the rotor ring 110. In this variant the gap 117 between the opposing side surfaces of the rotor disc and stator disc extends further between the prongs 29 and the outer surface 28 of the rotor, to permit movement of liquid along the outer surface 28 of the stator ring 110 and provide a passage via the gap 117 for a permanent liquid flow. The prongs 29 also form a notch-like channel for fluid to pass between the prongs 29 after exiting the stator notches, similar to the outer rotor notches in the other variants.

The features described with reference to FIGS. 18 to 22 can be combined for particularly effective formation of toroid vortexes in the flow.

While the examples provided above are concerned with a centrifugal pump moving fluid in radial direction toward the rotor/stator discs, it should be appreciated that a toroid vortex dispersion can similarly be created in a pump that pumps fluid in an axial direction toward suitably adapted rotor/stator discs.

Figure 23:
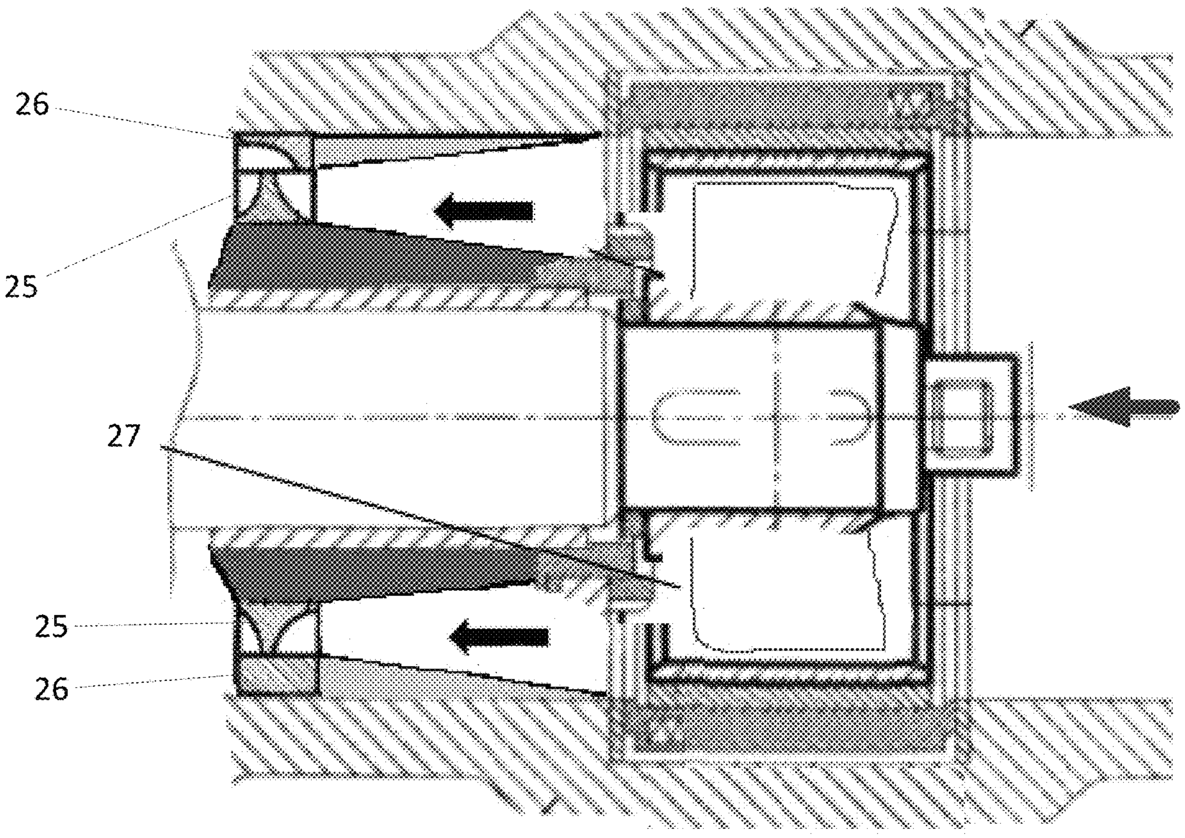
FIG. 23 shows a schematic illustration of an alternative generator with axial flow.

FIG. 23 provides a schematic illustration of an alternative generator with a rotor disc and a stator disc adapted for axial flow, rather than radial flow, with an axial flow impeller 27 instead of a radial flow impeller as described above.

In this configuration, the stator ring 26 is arranged concentrically outside the rotor ring 25 with a gap between the inner cylindrical surface of the stator ring 26 and the outer cylindrical surface of the rotor ring 25. The rotor ring 25 has inner rotor notches on a flow-facing side such that flow from the impeller can enter the inner rotor notches. The stator ring 26 has stator notches arranged on its inner cylindrical surface, facing the rotor ring. The flow is redirected by the inner rotor notches toward the stator ring, either entering the gap between the rings (in the configuration illustrated in the lower half of the cross section in FIG. 23) or entering a stator notch (in the configuration illustrated in the upper half of the cross section in FIG. 23). The stator notches redirect the fluid further.

For efficient formation of toroidal vortices, the flow entering the inner rotor notches has a tangential velocity (tangential to the rotational motion of the rotor) of e.g. at least 15-25 m/sec. Suitable guide vanes can be provided upstream of the rotor ring, to ensure that the flow entering the inner rotor notches has a suitable tangential velocity, while ensuring that the generator creates a pressure of at least 5 to 7 atmospheres (506-709 kPa). In the absence of a tangential velocity component the rotor ring causes such a tangential velocity component to be produced in the flow, which can result in a relevant loss of energy and less efficient formation of toroidal vortices.

Alternatives

It will be appreciated from the above description that many features of the different examples are interchangeable and combinable. The disclosure extends to further examples comprising features from different examples combined together in ways not specifically mentioned. Indeed, there are many features presented in the above examples and it will be apparent that these may be advantageously combined with one another.

The invention claimed is:

1. A method of precipitating salt out of an aqueous solution, comprising steps of:

providing the aqueous solution of one or more salts; and forming a flow with toroidal vortices in the aqueous solution, such that the aqueous solution is exposed to periodically alternating flow velocities and periodically alternating pressures, wherein the flow with toroidal vortices has a relative permittivity of 25-30, thereby initiating precipitation of salts from the solution.

2. A method according to claim 1, further comprising filtering precipitated salt particles from an aqueous suspension formed by precipitation of salts from the aqueous solution.

3. A method according to claim 2, wherein filtering is within 30 minutes of formation of toroidal vortices.

4. A method according to claim 2, further comprising maintaining the flow following formation of toroidal vortices until filtering.

5. A method according to claim 1, wherein the method is continuous.

6. A method according to claim 1, wherein the aqueous solution is provided at ambient temperature.

7. A method according to claim 1, wherein the flow comprises, in the same flow, a first local velocity of at least 100 meters per second and a second local velocity of up to 10 meters per second.

8. A method according to claim 1, wherein the flow with toroidal vortices has an average velocity of at least 10 meters per second.

9. A method according to claim 1, wherein the peripheral flow velocity in a toroidal vortex is greater than the flow velocity in the fluid outside the toroidal vortex by a factor of at least 3.

10. A method according to claim 1, wherein the flow comprises, in the same flow, a first local pressures of at least 10 MPa and a second local pressure of up to 1 mPa.

11. A method according to claim 1, wherein the flow with toroidal vortices has an average pressure of at least 600 kPa.

12. A method according to claim 1, wherein the flow comprises high-frequency alternating flow velocities and/or high-frequency alternating pressures.

13. A method according to claim 1, wherein the toroidal vortices have a typical diameter of at least 10 μm.

14. A method according to claim 1, wherein the flow includes at least 150 toroidal vortices per litre of the aqueous solution.

15. A method according to claim 1, wherein the flow is formed by a notched rotor rotating in cooperation with a notched stator to block and open cyclically a plurality of passages for a fluid.

16. A method of forming salt particles, comprising steps of:

providing an aqueous solution of one or more salts;

forming a flow with toroidal vortices in the aqueous solution, such that the aqueous solution is exposed to periodically alternating flow velocities and periodically alternating pressures, wherein the flow with toroidal vortices has a relative permittivity of 25-30, thereby initiating precipitation of salts from the solution; and separating salt particles from an aqueous suspension formed by precipitation of salts from the aqueous solution.

17. A method according to claim 16, wherein the separation is by filtration and/or wherein the salt particles are nanocrystalline particles.

18. A method according to claim 16, wherein the flow is formed by a notched rotor rotating in cooperation with a notched stator to block and open cyclically a plurality of passages for a fluid.

* * * * *